(12) United States Patent
Vijayan

(10) Patent No.: US 11,954,675 B2
(45) Date of Patent: Apr. 9, 2024

(54) SYSTEMS AND METHODS FOR IMPLEMENTING BLOCKCHAIN-BASED CONTENT ENGAGEMENT PLATFORMS UTILIZING MEDIA WALLETS

(71) Applicant: Artema Labs, Inc., Los Angeles, CA (US)

(72) Inventor: Madhu Vijayan, Venice, CA (US)

(73) Assignee: Artema Labs, Inc., Los Angeles, CA (US)

( * ) Notice: Subject to any disclaimer, the term of this patent is extended or adjusted under 35 U.S.C. 154(b) by 0 days.

(21) Appl. No.: 17/660,997

(22) Filed: Apr. 27, 2022

(65) Prior Publication Data

US 2022/0253834 A1 Aug. 11, 2022

Related U.S. Application Data

(63) Continuation of application No. 16/459,500, filed on Jul. 1, 2019, now Pat. No. 11,348,099.

(Continued)

(51) Int. Cl.
*G06Q 20/36* (2012.01)
*G06F 16/27* (2019.01)
(Continued)

(52) U.S. Cl.
CPC ......... *G06Q 20/3678* (2013.01); *G06F 16/27* (2019.01); *G06Q 20/389* (2013.01);
(Continued)

(58) Field of Classification Search
CPC .................................................. G06Q 20/389
(Continued)

(56) References Cited

U.S. PATENT DOCUMENTS

| 4,309,569 A | 1/1982 | Merkle |
| 7,647,243 B2 | 1/2010 | Woolston |

(Continued)

FOREIGN PATENT DOCUMENTS

| EP | 3814967 A1 | 5/2021 |
| FR | 3082023 A1 | 12/2019 |
| WO | 2020010023 A1 | 1/2020 |

OTHER PUBLICATIONS

International Partial Search Report for International Application No. PCT/US2019/040194, dated Aug. 22, 2019, 2 Pgs.

(Continued)

*Primary Examiner* — Sara C Hamilton
(74) *Attorney, Agent, or Firm* — KPPB LLP

(57) ABSTRACT

Systems and methods are described for implementing blockchain-based content engagement platforms. In several embodiments, the content engagement platform includes a registry service which enables verified content creators to mint Non-Fungible Tokens (NFTs). In many embodiments, media wallet applications enable users to securely store NFTs and/or other tokens on their devices. In a number of embodiments, the media wallet applications collect data concerning media consumed by users and aggregate the media consumption data in a permissioned analytics blockchain. The manner in which the media consumption data is stored can enable users to control permission to access their personal data. In one embodiment, a media wallet is provided that can securely store NFTs, display a user interface through which user instructions concerning data access permissions are received, and cause media consumption data to be written to at least one immutable ledger in conjunction with a set of data access permissions.

20 Claims, 15 Drawing Sheets

US 11,954,675 B2

Page 2

Related U.S. Application Data

(60) Provisional application No. 62/869,379, filed on Jul. 1, 2019, provisional application No. 62/846,465, filed on May 10, 2019, provisional application No. 62/692,848, filed on Jul. 1, 2018.

(51) Int. Cl.
| | |
|---|---|
| G06Q 20/38 | (2012.01) |
| H04L 9/32 | (2006.01) |
| H04L 9/40 | (2022.01) |
| H04L 9/00 | (2022.01) |

(52) U.S. Cl.
CPC ............ *H04L 9/3247* (2013.01); *H04L 63/08* (2013.01); *H04L 9/50* (2022.05); *H04L 2209/56* (2013.01)

(58) Field of Classification Search
USPC .......................................................... 705/41
See application file for complete search history.

(56) References Cited

U.S. PATENT DOCUMENTS

| | | | |
|---|---|---|---|
| 10,348,505 | B1 | 7/2019 | Crawforth et al. |
| 11,348,099 | B2 | 5/2022 | Vijayan |
| 11,582,040 | B2* | 2/2023 | Soundararajan ...... H04L 9/3226 |
| 2009/0119298 | A1 | 5/2009 | Faitelson et al. |
| 2013/0246477 | A1 | 9/2013 | Faitelson et al. |
| 2015/0164192 | A1 | 6/2015 | Gross |
| 2016/0071096 | A1 | 3/2016 | Rosca |
| 2016/0300234 | A1 | 10/2016 | Moss-Pultz et al. |
| 2016/0358186 | A1 | 12/2016 | Radocchia et al. |
| 2017/0134161 | A1 | 5/2017 | Goeringer et al. |
| 2017/0140408 | A1* | 5/2017 | Wuehler ............ G06Q 30/0207 |
| 2017/0214522 | A1 | 7/2017 | Code et al. |
| 2017/0236143 | A1 | 8/2017 | Code et al. |
| 2018/0308078 | A1 | 10/2018 | Emmerson |
| 2019/0130507 | A1 | 5/2019 | Stollman |
| 2019/0220836 | A1 | 7/2019 | Caldwell |
| 2019/0312941 | A1 | 10/2019 | Maccini et al. |
| 2019/0319968 | A1 | 10/2019 | Mehta |
| 2019/0325522 | A1* | 10/2019 | Bathia .................... G06V 20/63 |
| 2019/0354943 | A1 | 11/2019 | Mulye et al. |
| 2019/0362389 | A1 | 11/2019 | Turner et al. |
| 2020/0005284 | A1 | 1/2020 | Vijayan |
| 2020/0134671 | A1 | 4/2020 | Maccini et al. |

OTHER PUBLICATIONS

International Preliminary Report on Patentability for International Application PCT/US2019/040194, Report dated Jan. 5, 2021, dated Jan. 14, 2021, 6 Pgs.
International Search Report and Written Opinion for International Application No. PCT/US2019/040194, Search completed Oct. 16, 2019, dated Nov. 20, 2019, 14 Pgs.
"A Next-Generation Smart Contract and Decentralized Application Platform", Retrieved from: https://github.com/ethereum/wiki/wiki/White-Paper, Last edited by Chris Chinchilla on Jun. 17, 2019, 176 revisions, Printed Jun. 2019, 49 pgs.
"About Hyperledger", Hyperledger, Retrieved from: https://www.hyperledger.org/about, 2018, Printed Jun. 2019, 8 pgs.
"About Us", CryptoKitties, Retrieved from: https://www.cryptokitties.co/about, Printed Jun. 2019, 5 pgs.
"Access Control Lists (ACL); What is an Access Control List", Hyperledger, Retrievd from: https://hyperledger-fabric.readthedocs.io/en/release-1.4/access_control.html, 2019, 1 pg.
"Collectibles DApps", Coin Clarity, 2019, 8 pgs.
"cryptocurrency standards", Trezor Wiki, Retrieved from: https://wiki.trezor.io/BIP32#BIP32_-_Hierarchical_deterministic_wallets, Printed 2019, 7 pgs.
"DCore Technical Description", Retrieved from: https://docs.decent.ch > DCoreTechDesc, Printed Jun. 2019, 8 pgs.
"FAQ", CryptoKitties, Retrieved from: https://www.cryptokitties.co/faq, Printed Jun. 2019, 7 pgs.
Adeyanju, "Blockchain in Media: How Blockchain Can Help Advertising", COINTELEGRAPH, Aug. 2, 2018, 6 pgs.
Annamalai, "Blockchain—What is Permissioned vs. Permissionless?", posted Jan. 10, 2017 by bornonjuly4, 3 pgs.
BE'ERY, "Implementing Open-Source TSS to Binance Coin (BNB)", ZenGo, Retrieved from: https://zengo.com/implementing-open-source-tss-to-binance-coin-bnb/, May 19, 2019, 7 pgs.
Benlendorf, "Meet Hyperledger: An "Umbrella" for Open Source Blockchain & Smart Contract Technologies", Hyperledger, Sep. 13, 2016, 8 pgs.
Bernard, "The Value of those Weird Blockchain Virtual Pets, Cryptokitties, Is Plummenting", Business Insider, Jun. 18, 2018, 4 pgs.
Brillant, "How to deploy NFT tokens on TomoChain", TomoChain, Medium, Mar. 26, 2019, 20 pgs.
Brown et al., "Corda: An Introduction", Aug. 2016, 15 pgs.
Cheng, "Meet CryptoKittes, the $100,000 digital beanie babies epitomizing the cryptocurrency mania", CNBC, Dec. 6, 2017, 7 pgs.
Dapper Labs, "Getting Started—Download Dapper", Printed Jun. 2019, 7 pgs.
Dapper Labs, "Nft License 2.0: Why a NFT can do what no other creative IP can do", Medium, Jan. 22, 2019, 5 pgs.
Dapper Labs, "The best way to blockchain", Printed Jun. 2019, 10 pgs.
Dapper Labs, "The Dapper Difference", Printed Jun. 2019, 9 pgs.
Dapper Labs, "Why Dapper is a smart contract wallet", Dapper Labs, Medium, Apr. 24, 2019, 4 pgs.
Dcore, "Blockchain You Can Easily Build On", DECENT, 2019, 5 pgs.
De Candia, "Dapper: the smart wallet for ERC20 and ERC721 Token", the Cryptonomist, May 10, 2019, 2 pgs.
Entriken et al., "EIP 721: ERC-721 Non-Fungible Token Standard", Ethereum Improvement Proposals, retrieved from: https://eips.ethereum.org/EIPS/eip-721, Jan. 24, 2018, No. 721.
ERC-721, "What is ERC-721?", Retrieved from: http://erc721.org/, Printed Jun. 2019, 9 pgs.
Ge et al., "Blockchain for agriculture and food: Findings from the pilot study", Wageningen Economic Research, Dec. 2017.
Gharegozlou, "Meet Dapper: a Smart Wallet to Make Blockchain Safe for Everyone", Medium, May 9, 2019, 7 pgs.
Herbaut et al., "A Model for Collaborative Blockchain-Based Video Delivery Relying on Advanced Network Services Chains", IEEE Communications, Sep. 8, 2017, vol. 55, No. 9, 14 pgs.
Jurowiec, "Blockchain in Content Distribution", Oct. 6, 2018, 11 pgs.
Kadlyala, "Nuances Between Permissionless and Permissioned Blockchains", Medium, Feb. 17, 2018, 6 pgs.
Lockyer et al., "EIP 998: ERC-998 Composable Non-Fungible Token", Ethereum Improvement Proposals, retrieved from: https://eips.ethereum.org/EIPS/eip-998, Jul. 7, 2018.
Milosevic, "The latest gossip on BFT consensus", Retrieved from: https://arxiv.org/abs/1807.04938, Version 3, Nov. 22, 2019. Earliest Version Jul. 2018.
Monitor Deloitte, "Blockchain @ Media A new Game Changer for the Media Industry", Blockchain Institute, Retrieved from: https://www2.deloitte.com/content/dam/Deloitte/tr/Documents/technology-media-telecommunications/deloitte-PoV-blockchain-media.pdf, 2017, 22 pgs.
Phare, "TomoChain: An Overview", TomoChain, Medium, Sep. 2, 2018, 10 pgs.
Phillips, "5 Crypto-Collectibes You Can Buy Right Now", Blocks Decoded, Jun. 21, 2019, 19 pgs.
Radomski et al., "EIP 1155: ERC-1155 Multi Token Standard", Ethereum Improvement Proposals, retrieved from: https://eips.ethereum.org/EIPS/eip-1155,Jun. 17, 2018.
Skellern, "What's the Deal with NFT Standards?", ECOMI, Medium, Sep. 20, 2018, 10 pgs.
Stehlik, "User-Mintable, Privacy-Enabled NFTs on Ethereum", Centrifuge, Aug. 8, 2018, 4 pgs.
Stehlik et al., "Privacy-Enabled NFTs: Self-Mintable Non-Fungible Tokes with Private Off-Chain Data", Aug. 9, 2018, 11 pgs.

(56) References Cited

OTHER PUBLICATIONS

Tomochain R&D Team, "TomoChain; Masternodes Design Technical White Paper Version 1.0", May 30, 2018, 19 pgs.
Username: Blockchain Cuties, "Fiat Currency and Dapper Wallet Integration", Medium, May 13, 2019, 6 pgs.
Username: Dapper Labs, "Access Dapper when and where you want it", Medium, May 30, 2019, 4 pgs.
Vogelsteller et al., "EIP 20: ERC-20 Token Standard", Ethereum Improvement Proposals, retrieved from: https://eips.ethereum.org/EIPS/eip-20, Nov. 19, 2015.
Wikipedia, "CryptoKitties", Wikipedia, Last edited Jun. 20, 2019, 4 pgs.
Wikipedia, "InterPlanetary File System", Wikipedia, Last edited Jun. 19, 2019, 3 pgs.
Zeriuali, "Dapper Ethereum Smart Contract Wallet: Security Review", May 9, 2019, 18 pgs.
Zyskind et al., "Decentralizing Privacy: Using Blockchain to Protect Personal Data", 2015 IEEE Security and Privacy Workshops (SPW) Conference, May 2015, 5 pgs.
Extended European Search Report for European Application No. 19830831.4, Search completed Jan. 26, 2022, dated Feb. 4, 2022, 8 Pgs.

\* cited by examiner

SYSTEMS AND METHODS FOR IMPLEMENTING BLOCKCHAIN-BASED CONTENT ENGAGEMENT PLATFORMS UTILIZING MEDIA WALLETS

CROSS-REFERENCE TO RELATED APPLICATIONS

The current application is a continuation of U.S. patent application Ser. No. 16/459,500, entitled "Systems and Methods for Implementing Blockchain-Based Content Engagement Platforms Utilizing Media Wallets", filed Jul. 1, 2019, which claims priority to U.S. Provisional Patent Application No. 62/869,379 entitled "Blockchain Platform for the Entertainment Industry", filed Jul. 1, 2019, U.S. Provisional Patent Application No. 62/846,465 entitled "Advanced Media Wallet", filed May 10, 2019, and U.S. Provisional Patent Application No. 62/692,848 entitled "Applications Leveraging a Bifurcated Content Delivery Platform", filed Jul. 1, 2018, the disclosures of which are incorporated herein by reference in their entirety.

FIELD OF THE INVENTION

The present invention relates generally to distributed computing platforms for maintaining immutable ledgers and more specifically to the generation of verifiable non-fungible tokens based upon immutable ledgers using smart contracts and the granting of fine-grained permissions to access data written to immutable ledgers.

BACKGROUND

The term blockchain is typically used to refer to a distributed ledger that can record transactions between two computer systems efficiently and in a verifiable and permanent way. The permanence of records written to a blockchain is the reason that blockchains can be considered to be a form of immutable ledger. Transactions between computers recorded in a blockchain cannot be altered retroactively without the alteration of all subsequent blocks.

A typical blockchain is a growing list of records, referred to as blocks, that are linked using cryptography. Each block can contain a cryptographic hash of the previous block, a timestamp, and transaction data. In this configuration, the blockchain is structured as a hash tree in which every leaf node is labeled with the hash of a data block, and every non-leaf node is labeled with the cryptographic hash of the labels of its child nodes. Structuring a blockchain as a hash tree can enable efficient and secure verification of the content of a large data structure. Systems and methods for implementing hash trees are described in U.S. Pat. No. 4,309,569 to Merkle, the disclosure of which is incorporated herein by reference in its entirety.

A blockchain database is typically managed autonomously using a peer-to-peer network and a distributed timestamping server. In many decentralized blockchains, every node in the decentralized system has a copy of the blockchain. Transactions are broadcast over the computer network and data quality is maintained by massive database replication and computational trust.

Many blockchains are publicly accessible in a manner that can be referred to as permissionless. In a permissionless blockchain, any computing system can choose to run a node for the blockchain and participate in transaction verifications (via the mining mechanism), as well as create smart contracts on the network. The Bitcoin and Ethereum blockchain networks are permissionless and employ a crypto-economic model (driven by proof-of-work consensus mechanisms) that incentivizes people to run network nodes. In these frameworks, network participants are rewarded for their contributions through issuance of cryptographic tokens, which are often referred to as crypto coins or cryptocurrency.

A permissioned blockchain is typically a closed computing system in which each participant is well defined. This type of blockchain is typically built to allow an organization or a consortium of organizations to efficiently exchange information and record transactions. In a permissioned blockchain, only preapproved entities can run the nodes that validate transaction blocks and execute smart contracts on the blockchain.

In the context of both permissioned and permissionless blockchains, the term smart contract is often used to refer to software programs that run on a blockchain. While a standard legal contract outlines the terms of a relationship (usually one enforceable by law), a smart contract enforces a set of rules using cryptographic code. Smart contracts are often developed as high-level programming abstractions that can be compiled down to bytecode that can be deployed to a blockchain for execution by computer systems using a virtual machine deployed in conjunction with the blockchain. Once a smart contract is written to a blockchain, the code of the smart contract acts as a programmatically defined autonomous agent with its own persistent variables (and often key/value store) that executes by computer systems within the blockchain when the smart contract is referenced by a message and/or transaction. In many instances, smart contracts execute by leveraging the code of other smart contracts in a manner similar to calling upon a software library.

SUMMARY OF THE INVENTION

Systems and methods in accordance with many embodiments of the invention are utilized in the implementation of blockchain-based content engagement platforms. In several embodiments, the content engagement platform includes a registry service which enables verified content creators to mint Non-Fungible Tokens (NFTs). NFTs can be created around a large range of real world media content and intellectual property. Movie studios can mint digital collectibles for their movies, characters, notable scenes and/or notable objects. Record labels can mint digital collectibles for artists, bands, albums and/or songs. Similarly, official digital trading cards can be made from likeness of celebrities, cartoon characters and/or gaming avatars. Virtually any media intellectual property that can be merchandised and licensed in the real world can also be tokenized into a digital collectible. However, unlike real world collectibles, which can have limited utility other than for display, NFTs minted using content engagement platforms in accordance with various embodiments of the invention can have multifunctional programmable use cases including as rewards, private access to premium content and experiences, as discounts toward the purchase of goods, among many other value-added use cases. Furthermore, they are not bound to the restrictions of their native environments, allowing them to be transferred into and used by $3^{rd}$ party applications and platforms.

In many embodiments, media wallet applications enable users to securely store NFTs and/or other tokens on their devices. Furthermore, the media wallet applications collect data concerning media consumed by users in a way that enables the users to control permission to access their personal data. Since the advent of the Internet, online platforms have been capturing consumer activity and using this metadata for their own benefit, without the user's conscious consent. This controversial practice has raised serious questions and concerns in the market related to user privacy, as it has become the industry standard for all major platforms to participate in data capturing in one form or another. Audiences have become the product, as user consumption data is sold off for profit, with zero trickle-down benefit to the consumer. Systems and methods in accordance with a number of embodiments of the invention utilize media wallet applications to address this issue head on by not only allowing users to opt-in or opt-out of sharing their consumption data, but actually reward them directly with fungible tokens and/or non-fungible tokens for their active participation. Users can either operate in Private mode, which blocks all access to their consumption data from outside parties. Or, the user can opt-in to sharing their data, and passively earn reward tokens from entities such as (but not limited to) their favorite brands and media content providers.

One embodiment of the invention is a media wallet including: a processor; a network interface; and memory containing a media wallet application. In addition, the processor is capable of being configured by the media wallet application to: securely store non-fungible tokens (NFTs), where each NFT is associated with a programmatically defined smart contract written to at least one immutable ledger; display a user interface through which user instructions concerning data access permissions are received; and cause media consumption data to be written to the at least one immutable ledger in conjunction with a set of data access permissions determined in accordance with user instructions concerning data access permission received via the user interface.

In a further embodiment, the processor is capable of being configured by the media wallet application to enable purchase of NFTs using fungible tokens via at least one distributed exchange.

In another embodiment, the processor is capable of being configured by the media wallet application to receive NFTs distributed via push notification.

In a still further embodiment, the processor is capable of being configured by the media wallet application to manage accounts on multiple immutable ledgers using a deterministic wallet key.

In still another embodiment, the at least one immutable ledger includes: an NFT blockchain to which the smart contracts for each NFT are written; and a permissioned analytics blockchain to which media consumption data is written.

In a yet further embodiment, the set of data access permissions comprise a compound identity.

In yet another embodiment, the set of data access permissions specify an access control list with respect to the media consumption data.

In a further embodiment again, the processor is capable of being configured by the media wallet application to write media consumption data to the at least one immutable ledger by securely storing the media consumption data at a network accessible storage location and writing a pointer to the securely stored media consumption data in the at least one immutable ledger.

In another embodiment again, the processor is capable of being configured by the media wallet application to cause updated data access permissions to be written to the at least one immutable ledger in response to receipt of user instructions via the user interface regarding modified data sharing permissions.

In a further additional embodiment, the processor is capable of being configured by the media wallet application to: present an offer via the user interface; and initiate a transfer of tokens and cause updated data access permissions to be written to the at least one immutable ledger in response to receipt of a user instruction to accept the presented offer via the user interface.

In another additional embodiment, the processor is capable of being configured by the media wallet application to cause media consumption data to be written to the at least one immutable ledger by providing observation data to a validator service, where the validator service is capable of validating media consumption based upon observation data and writing media consumption data to the immutable ledger.

In a still yet further embodiment, the processor is capable of being configured by the media wallet application to collect observation data, where the observation data comprises at least one piece of data selected from a group including: audio samples of ambient media; location based check-in with respect to media viewed at a movie theater; a photograph of a movie ticket; a screen capture of a media player user interface; a user submission of a media content rating; data from a log file maintained on a user device; information shared via a wireless network indicating presence of another user devices containing a media wallet application; information obtained from another application installed on the user device; and information obtained via a web service by the media wallet application.

A further embodiment of the invention is a content engagement platform including a plurality of computer systems connected via a network, where the plurality of computer systems: form at least one immutable ledger; and provide a non-fungible token (NFT) registry, where entries in the NFT registry correspond to programmatically defined smart contracts written to the at least one immutable ledger. In addition, at least one of the computer systems is configured as an NFT registry service, where the NFT registry service is capable of: authenticating content creator credentials; and minting NFTs to the at least one immutable ledger and recording the minted NFT in the NFT registry, where minted NFTs are cryptographically co-signed by the NFT registry service and an authenticated content creator.

In another embodiment, the at least one immutable ledger includes: a public blockchain; an NFT blockchain; and a permissioned analytics blockchain.

In a still further embodiment, the at least one computer system configured as an NFT registry service is further capable of minting NFTs that are programmatically defined to transfer non-fungible tokens to a content creator account upon the occurrence of at least one transaction type involving the NFT.

In still another embodiment, the at least one immutable ledger comprises an NFT blockchain and the at least one computer system configured as an NFT registry service is configured to mint NFTs to the NFT blockchain.

A yet further embodiment also includes user devices configured by media wallet applications capable of securely storing NFTs owned by the user on the user device.

In yet another embodiment, the media wallet applications are capable of enabling purchase of NFTs using fungible tokens via at least one distributed exchange.

In a further embodiment again, wherein media wallet applications are capable of receiving NFTs distributed via push notification.

In another embodiment again, the media wallet application manages accounts on multiple immutable ledgers using a deterministic wallet key.

In a further additional embodiment, the media wallet applications are capable of causing media consumption data to be written to the at least one immutable ledger.

In another additional embodiment, the at least one immutable ledger includes: an NFT blockchain and the at least one computer system configured as an NFT registry service is configured to mint NFTs to the NFT blockchain; and a permissioned analytics blockchain and user devices are configured by media wallet applications to cause media consumption data to be written to the permissioned analytics blockchain.

In a still yet further embodiment, the media wallet applications configure the user devices to cause the media consumption data to be written to the at least one immutable ledger by the plurality of computer systems in conjunction with a set of data access permissions.

Still yet another embodiment also includes an analytics computer system. In addition, the plurality of computer systems provide a data access service and the analytics computer system is capable of providing a request to the data access service for access to media consumption data written to the at least one immutable ledger. Furthermore, the data access service is configured to provide access to the requested media consumption data in a manner that is consistent with the data access permissions of the requested media consumption data.

In a still further embodiment again, the set of data access permissions comprises a compound identity.

In still another embodiment again, the data access service is capable of validating that an analytics computer system is a member of a compound identity based upon a public key provided by the analytics computer system and public keys associated with the joint identity in the at least one immutable ledger.

In a still further additional embodiment, the set of data access permissions specify an access control list with respect to the media consumption data and the data access service is configured to restrict access to the media consumption data based upon the access control list.

In still another additional embodiment, writing media consumption data to the at least one immutable ledger comprises securely storing the media consumption data at a network accessible storage location and writing a pointer to the securely stored media consumption data to the at least one immutable ledger.

In a yet further embodiment again, the media wallet applications are capable of causing updated data access permissions to be written to the at least one immutable ledger in response to user instructions regarding modified data sharing permissions and the data access service is configured to restrict access to media consumption data previously written to the immutable ledger in a manner that is consistent with the updated data access permissions.

In yet another embodiment again, the media wallet applications are capable of presenting offers to users via a user interface, where acceptance of an offer causes a media wallet application to initiate a transfer of tokens to the media wallet application in exchange for causing updated data access permissions to be written to the at least one immutable ledger.

In a yet further additional embodiment, at least one media wallet application is capable of causing media consumption data to be written to the at least one immutable ledger by providing observation data to at least one of the plurality of computer systems configured as a validator service, where the validator service is capable of validating media consumption based upon observation data and writing media consumption data to the immutable ledger.

In yet another additional embodiment, observation data comprises at least one piece of data selected from the group including: audio samples of ambient media; location based check-in with respect to media viewed at a movie theater; a photograph of a movie ticket; a screen capture of a media player user interface; a user submission of a media content rating; data from a log file maintained on a user device; information shared via a wireless network indicating presence of another user devices containing a media wallet application; information obtained from another application installed on the user device; and information obtained via a web service by the media wallet application.

In a further additional embodiment again, at least one media wallet application captures observation data passively.

In another additional embodiment again, at least one media wallet application commences capture of observation data in response to an instruction received via a user interface.

In a still yet further embodiment again, the media wallet applications are capable of requesting that the plurality of computer systems authenticate that an NFT was minted by a particular content creator. In addition, the plurality of computer systems authenticate the NFT based upon at least one process selected from the group including: a comparison of a signature of a content creator that minted the NFT and cryptographic information published by the particular content creator identified by a specific media wallet application; and confirming that transactions in the at least one immutable ledger involving the NFT and the particular content creator are consistent with a smart contract underlying the NFT.

In still yet another embodiment again, a software application accessible via a user device provides a modified user interface based upon storage of a specific NFT within a media wallet application present on a particular user device.

A still yet further additional embodiment also includes a ticketing system that provides access in exchange for presentation of a user device containing a media wallet application in which a particular NFT is stored, where the ticketing system causes modification of the metadata of the NFT in response to presentation of the NFT.

In still yet another additional embodiment, the NFT comprises data selected from the group including: bytecode that programmatically describes behavior of the NFT; bytecode specifying at least one transaction rule with respect to the NFT; a pointer to a piece of content; a piece of content; and metadata describing the NFT. In addition, the NFT can include any combination of the data from the above group.

In a yet further additional embodiment again, the plurality of computer systems can cause an NFT to be moved from a first immutable ledger to a second immutable ledger.

In yet another additional embodiment again, the plurality of computer system comprises a bridge system responsible for managing movement of NFTs between immutable ledgers.

Another embodiment of the invention is a permissioned analytics blockchain, including a plurality of computer systems connected via a network, where the plurality of computer systems: form at least one immutable ledger; receive requests to write data to the at least one immutable ledger; validate a basis for writing data to the at least one immutable ledger; and securely write data to the at least one immutable ledger in conjunction with a set of data access permissions in response to validation of a basis for writing the data to the at least one immutable ledger. Furthermore, the plurality of computer systems further provides a data access service. In addition, the permissioned analytics blockchain includes a data retrieval computer system, where the data retrieval computer system is capable of providing a request to the data access service to access data written to the at least one immutable ledger; and the data access service is configured to provide access to the requested data in a manner that is consistent with data access permissions of the requested media consumption data.

In a still further embodiment, the data retrieval computer system is part of a compound identity that is permitted to access the requested data.

In yet another embodiment, the plurality of computer systems securely writes data to the at least one immutable ledger by securely storing the data at a network accessible storage location and writing a pointer to the securely stored data to the at least one immutable ledger.

Furthermore, features of specific embodiments identified above can be combined and/or interchanged to create additional embodiments in a manner that would clearly be appreciated by a skilled person in the field of immutable ledger design and secure distributed computing.

BRIEF DESCRIPTION OF THE DRAWINGS

FIGS. 4A-5C are user interfaces of various media wallet applications in accordance with a number of embodiments of the invention.

DETAILED DESCRIPTION

Figure 1:
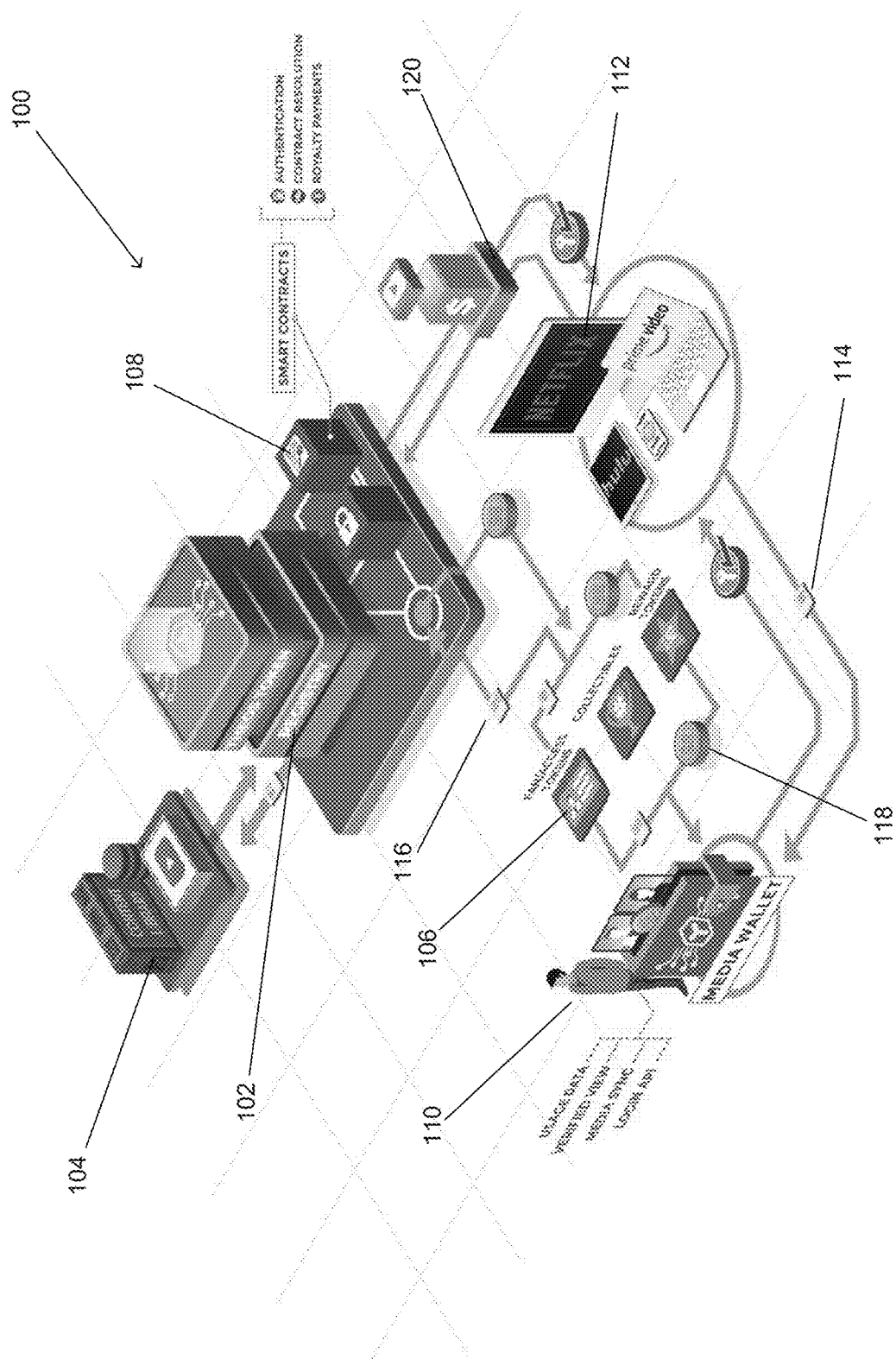
FIG. 1 is a conceptual diagram of a content engagement platform in accordance with an embodiment of the invention.

Turning now to the drawings, systems and methods for implementing blockchain-based content engagement platforms in accordance with various embodiments of the invention are illustrated. In several embodiments, blockchain-based content engagement platforms are content engagement platforms that include registry service which enable verified content creators to issue or mint Non-Fungible Tokens (NFTs). For example, if a movie studio owns a virtual media property, like an animated character from a movie, that studio can utilize the content engagement platform to mint an NFT to tokenize the character into a digital collectible. Possession of the NFT reflects the ownership of the collectible. It is non-interchangeable as each collectible is unique and serialized. In certain embodiments, the NFTs are minted in such a way that they can be authenticated independently of the entity that minted the NFT. In many embodiments, the content engagement platform also includes media wallet applications that enable users to securely store NFTs and/or other tokens on their devices. In a number of embodiments, the media wallet applications collect data concerning media consumed by users and aggregate the media consumption data in a permissioned analytics blockchain. The manner in which the permissioned analytics blockchain stores the media consumption data can enable users to grant and/or revoke permission to access their personal media consumption data.

The term "Non-Fungible Token" (NFT) has recently gained popularity for describing blockchain-based cryptographic tokens that are created with respect to a specific piece of content and which incorporate programmatically defined digital rights management. NFTs can be implemented on blockchains that support smart contracts in a manner that results in verifiable scarcity. In many instances, each NFT has a unique serial number and the NFT smart contract defines an interface that enables the NFT to be managed, owned and/or traded. A number of standards have emerged for defining interfaces for building NFTs on the Ethereum blockchain including (but not limited to) ERC-721 and ERC-1155, the disclosures of which are herein incorporated by reference in their entirety. NFTs can be contrasted with interchangeable or fungible tokens (e.g. Ether). Fungible tokens can be implemented on the Ethereum blockchain based upon standard interfaces including (but not limited to) the ERC-20 standard, the disclosure of which is incorporated by reference herein in its entirety.

In a number of embodiments, the smart contracts defining NFTs that can be minted within content engagement platforms specify fee distribution obligations with respect to specific types of transactions involving NFTs. In several embodiments, sale of an NFT within a content engagement platform can result in one or more residual royalty payment transactions that are recoded in the block chain including (but not limited to) a residual royalty payment to the content creator that minted the NFT. As is discussed further below, the authenticity of a particular NFT can be verified independently of the content creator by auditing transaction records associated with the NFT within the blockchain to confirm consistency with the smart contract underlying the NFT. For example, the presence of transactions reflecting residual royalty payments that a smart contract indicates should have occurred upon transfers of the NFT can be relied upon to verify the authenticity of the NFT. As can readily be appreciated, the manner in which one or more transactions written to a blockchain can be utilized to verify the authenticity of an NFT is largely dependent upon the requirements of a given application.

In a number of embodiments, content creators can issue NFTs to users within the content engagement platform. NFTs can be created around a large range of real world media content and intellectual property. Movie studios can mint digital collectibles for their movies, characters, notable scenes and/or notable objects. Record labels can mint digital collectibles for artists, bands, albums and/or songs. Similarly, official digital trading cards can be made from likeness of celebrities, cartoon characters and/or gaming avatars. Virtually any media intellectual property that can be merchandised and licensed in the real world can also be tokenized into a digital collectible. However, unlike real world collectibles, which have limited utility other than for display, NFTs minted using content engagement platforms in accordance with various embodiments of the invention can have multifunctional programmable use cases including as rewards, private access to premium content and experiences, as discounts toward the purchase of goods, among many other value-added use cases. Furthermore, they are not bound to the restrictions of their native environments, allowing them to be transferred into and used by $3^{rd}$ party applications and platforms. For example, a collectible movie character NFT can also be used cross-platform in a video game as the player's avatar; a functionality that the game only makes available to that NFT's owner. In many embodiments, each NFT has a set of attributes that define its unique properties. These can be interpreted differently by various platforms in order to create platform specific user experiences. The metadata associated with an NFT may also include digital media assets such as (but not limited to) images, videos about the specific NFT or the context in which it was created (studio, film, band, company song etc.).

In several embodiments, users can download and install media wallet applications to store NFTs on the same computing devices that they are using to consume streamed and/or downloaded content. The media wallet applications can gather data concerning media consumption on the computer devices on which the media wallet applications are installed and/or based upon observations indicative of media consumption independently of the device (e.g. observations of audio indicative of a particular piece of content, or observations of user location corresponding to the location of a movie theater). In several embodiments, the media wallet applications can cause the media consumption data to be written to a permissioned analytics blockchain. In a number of embodiments, the media wallet application builds a comprehensive viewing history across different categories of content (e.g. songs, movies, commercials, games, VR, AR, etc) that can be augmented with additional metadata such as (but not limited to) user rating and/or other forms of engagement. In the event that a user is willing to grant permission to a content creator, the content creator's authenticated computer system can access media consumption data written to the permissioned analytics blockchain. In several embodiments, the content creator's authenticated computer system can directly access media consumption data based upon user permissions. In a number of embodiments, user permissions enable the content creator's authenticated computer system to receive aggregated analytic data from nodes that can access the permissioned analytics blockchain, where the aggregated data is generated based upon media consumption data written to the permissioned analytics blockchain by users that have granted access permissions to the content creator.

In many embodiments, content creators can utilize the content engagement platform to provide incentives to users to grant permissions to access content consumption data aggregated onto the permissioned analytics ledger by media wallet applications. In several embodiments, the incentives can be in the form of fungible tokens and/or additional NFTs.

In many embodiments, the content engagement platform enables content creators and content owners to directly interact with consumers via a mutually beneficial token economy. The content engagement platform can passively track user media consumption data. Consumers can opt-in to sharing their consumption data with content creators in exchange for fungible tokens and/or NFTs, which can be traded to other users or exchanged for products, discounts, VIP access to events and/or experiences. As part of the platform, media wallets can offer consumers a vehicle for benefiting their fandom by opting in to share their consumption behavior in exchange for product discounts, VIP access and a variety of gamified fan experiences with their favorite content creators. Furthermore, media wallets can enable users to obtain NFTs that prove purchase of rights to access a particular piece of media content on one platform and use the NFT to gain access to the purchased content on another platform. In this way, a content engagement platform itself can act as a de facto industry standard to authenticate proof of ownership of media IP licenses and/or mint unique NFTs as digital collectibles. In this way, content engagement platforms in accordance with many embodiments of the invention can introduce new models of virtual license ownership and/or digital collectibles to media IP owners, creators and consumers.

While various aspects of content engagement platforms, NFTs, media wallets, and permissioned analytics blockchains are discussed above, content engagement platforms and different components that can be utilized within content engagement platforms in accordance with various embodiments of the invention are discussed further below.

I. Content Engagement Platforms

A content engagement platform in accordance with an embodiment of the invention is illustrated in FIG. 1. The content engagement platform 100 utilizes one or more immutable ledgers 102 (e.g. one or more blockchains) to enable a number of verified content owners 104 to access an NFT registry service to mint NFTs 106 in a variety of forms including (but not limited to) digital tickets, proof of media playback rights, digital collectibles, proof of ownership of tangible collectibles, and/or digital coupons. In a number of embodiments, digital tickets minted as NFTs can be utilized to establish proof of ownership of tickets at ticketed events (reducing fraud). In addition, the smart contracts underlying the digital tickets can require residual payments when digital tickets are transferred on a secondary market. In addition, the digital tickets can become or be exchanged for NFTs that are digital collectibles following the event. As can readily be appreciated, the flexibility of the smart contracts underlying NFTs means that any of a variety of NFTs can be issued as appropriate to the requirements of a given application in accordance with various embodiments of the invention.

Issuance of NFTs 106 via the content engagement platform 100 enables verification of the authenticity of NFTs independently of the content owner by confirming that transactions written to one or more of the immutable ledgers 102 are consistent with the smart contracts 108 underlying the NFTs. As is discussed further below, content owners 104 can provide the NFTs 106 to users to reward and/or incentivize engagement with particular pieces of content and/or other user behavior including (but not limited to) the sharing of user personal information (e.g. contact information or user ID information on particular services), demographic information, and/or media consumption data with the content creator and/or other entities. In addition, the smart contracts 108 underlying the NFTs can cause payments of residual royalties to content creators 104 when users engage in specific transactions involving NFTs (e.g. transfer of ownership of the NFT).

In a number of embodiments, users utilize media wallet applications 110 on their devices to store NFTs 106 distributed using the content engagement platform 100. Users can use a media wallet application 110 to obtain and/or transfer NFTs 106 and the content engagement platform can, in many embodiments, generate engagement rankings based upon user behavior that can be published via mechanisms including (but not limited to) leaderboards. As can readily be appreciated, NFTs 106 that are implemented using smart contracts 108 having interfaces that comply with open standards are not limited to being stored within media wallets and can be stored in any of a variety of wallet applications as appropriate to the requirements of a given application. Furthermore, a number of embodiments of the invention support movement of NFTs 106 between different immutable ledgers 102. Processes for moving NFTs between multiple immutable ledgers in accordance with various embodiments of the invention are discussed further below.

In several embodiments, the media wallet application 110 is capable of collecting observations concerning user behavior including (but not limited to) media consumption behavior. When the media wallet application 110 is installed upon a user device that is also used to consume media from media services 112 and/or is present when the user is consuming media in other ways (e.g. viewing content on a home theater or at a movie theater), then the media wallet application 110 can capture observations related to media playback on the device using a variety of techniques including (but not limited to) data 114 received from media services, audio samples of ambient media, location based check-in with respect to media viewed at a movie theater, photographs of movie tickets, screen captures of media player user interfaces and/or media players during media playback, user submission of a media content rating, inspection of log files, information shared by Bluetooth and/or other wireless networks indicating the presence of other user devices on which media wallet applications are stored, and/or access of information from other applications and/or web services via APIs. In several embodiments, the media consumption observations are captured passively. In a number of embodiments, the media consumption data is captured actively in response to user interaction with a smart wallet user interface instructing that observations be collected and/or manually inputting information concerning media consumption that can be verified through capture of observations. The raw data collected by the media wallet application 110 can be utilized to verify media consumption by the user and the verified media consumption data 116 can be written to an immutable ledger 102. In a number of embodiments, the media consumption data 116 is written to an immutable ledger 102 that is configured as a permissioned analytics blockchain.

In certain embodiments, the manner in which the media consumption data 116 is written to an immutable ledger 102 enables the media wallet application 110 to grant fine grained permissions with respect to access of the user's media consumption data. In a number of embodiments, users can determine the manner in which their media consumption data is accessed and by whom. In many instances, users can also revoke access to media consumption data stored within an immutable ledger 102 using the media wallet application 110.

In several embodiments, content creators 104 can incentivize a user to grant access to media consumption data 116 within an immutable ledger 102 using offers including (but not limited to) offers of tokens 118 and/or NFTs 106. In this way, the ability of the content creators to mint NFTs enables consumers to engage directly with the content creators and can be utilized to incentivize users to share with content creators data concerning user interactions with additional content.

In a number of embodiments, content creators 104 can perform analytics based upon media consumption data 116 written to an immutable ledger 102 based upon permissions granted to the data by various users within the content engagement platform 100. In certain embodiments, the permissions granted by individual users enable the content creators 104 to directly access data written to an immutable ledger 102. In many embodiments, the permissions granted by individual users enable authorized computing systems to access data within an immutable ledger 102 and content creators 104 can query the authorized computing systems to obtain aggregated information. The manner in which media consumption data written to an immutable ledger can be accessed by content creators and/or other entities in accordance with various embodiments of the invention is discussed further below.

While specific media wallet applications are described above with reference to FIG. 1, a number of different ways in which media wallet applications can capture observations, the observations can be validated to generate verified media consumption data, and the media consumption data can be written to immutable ledgers in accordance with various embodiments of the invention are discussed below. Furthermore, applications and method of collecting user behavior in accordance with various embodiments of the invention are not limited to media wallet applications or use within content engagement platforms. Accordingly, it should be appreciated that the data collection capabilities of any media wallet application described herein can also be implemented outside the context of a content engagement platform and/or in a dedicated application and/or in an application unrelated to the storage of fungible tokens and/or NFTs. Various systems and methods for implementing content engagement platforms and media wallet applications in accordance with various embodiments of the invention are discussed further below.

II. Content Engagement Platform Architectures

Content engagement platforms in accordance with various embodiments of the invention are not limited to any one particular architecture. Indeed, the architecture that is employed is largely dependent upon the extent to which the content engagement platform utilizes public blockchain infrastructure (e.g. Etherium) and/or is implemented using dedicated or permissioned blockchain technology. In a number of embodiments, the content engagement platform enables authorized users to mint NFTs to an NFT blockchain. As is discussed further below, provision of a dedicated NFT blockchain can assist with verification of the authenticity of the NFTs. Once minted, the NFTs may be able to be transferred from the NFT blockchain to other compatible blockchains.

Content engagement platforms in accordance with many embodiments of the invention can also incorporate a permissioned analytics blockchain as a store of verified media consumption data. In general, blockchains make data public or private and there is very limited support for enabling users to control whether transaction data written to the blockchain is public or private with respect to a particular entity. Content engagement platforms in accordance with certain embodiments of the invention can control the privacy of specific pieces of data with respect to particular entities in a manner that can be referred to as granting fine-grained permissions. Accordingly, content engagement platforms and/or other platforms that incorporate permissioned analytics in accordance with various embodiments of the invention can utilize a permissioned analytics blockchain as a repository of data, where users can grant and/or revoke fine-grained permissions to access the data.

Figure 2:
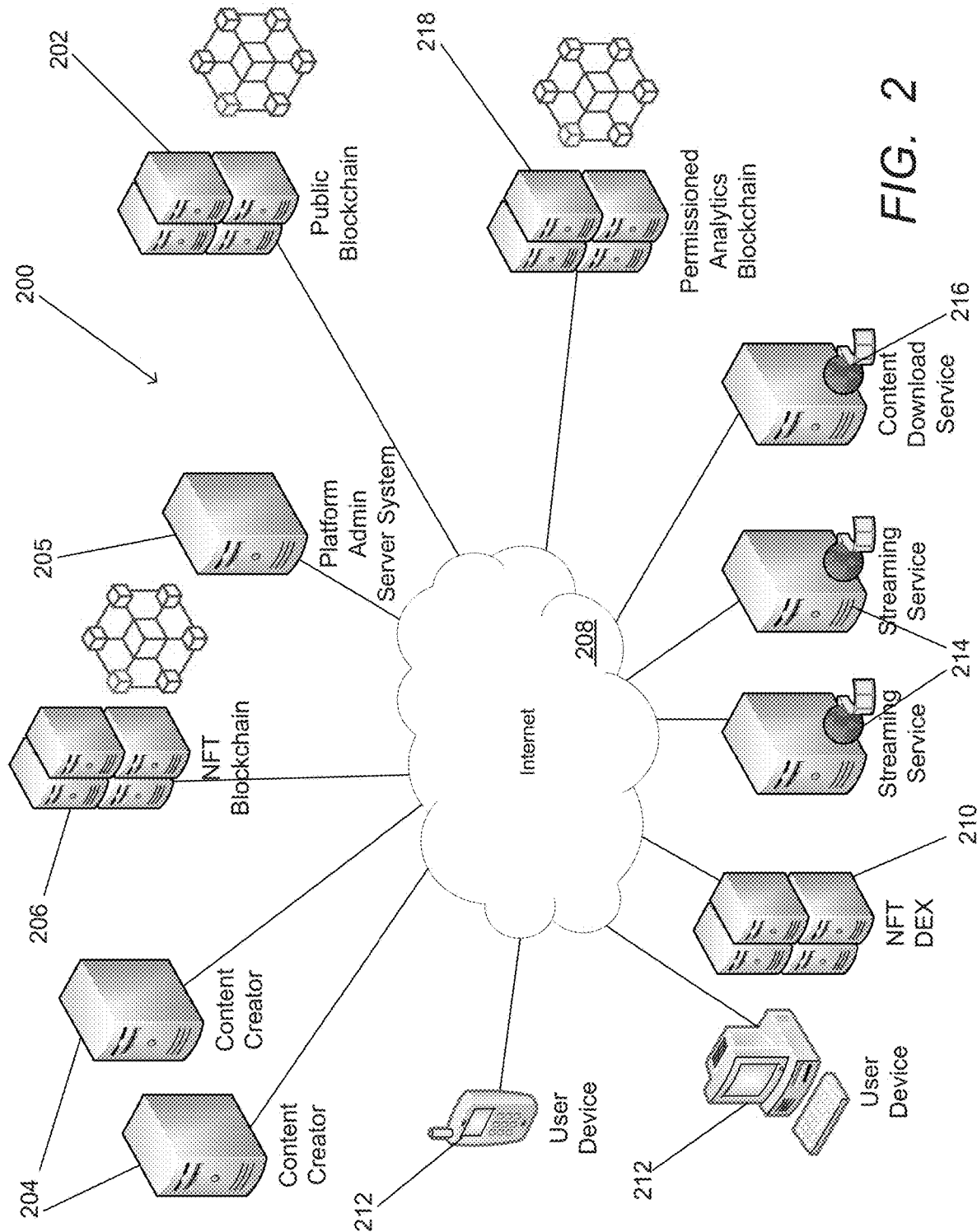
FIG. 2 is a network architecture diagram of a content engagement platform in accordance with an embodiment of the invention.

A content engagement platform that utilizes a public blockchain, an NFT blockchain, and a permissioned analytics blockchain in accordance with an embodiment of the invention is illustrated in FIG. 2. The content engagement platform 200 utilizes computer systems implementing a public block chain 202 such as (but not limited to) Etherium. A benefit of supporting interactions with a public blockchain 202 is that the content engagement platform 200 can support minting of standards based NFTs that can be utilized in an interchangeable manner with NFTs minted by sources outside of the content engagement platform on the public blockchain. In this way, the content engagement platform 200 and the NFTs minted within the content engagement platform are not part of a walled garden, but are instead part of a broader blockchain-based ecosystem. The ability of holders of NFTs minted within the content engagement platform 200 to transact via the public blockchain 202 increases the likelihood that individuals acquiring NFTs will become users of the content engagement platform.

In many embodiments, NFTs can be minted by any of a number of content creators 204 that have been granted access to a minting service or NFT registry service that is typically provided by a content engagement platform administrator 205. The content creators 204 can be authenticated by the content engagement platform to confirm that the content creator holds the necessary intellectual property rights to mint an NFT with respect to a particular character and/or piece of content. Examples of content creators can include (but are not limited to) record labels, movie studios, restaurants, retail stores, brands, sports franchises, and/or celebrities. An administrator of the content engagement platform can vet an applicant prior to approval as a content creator 204. Once approved, the content creator 204 can be provided with the right to cryptographically sign NFTs and access an account in which royalty payments can be deposited based upon residual royalty rules specified within the smart contracts underlying NFTs minted by the content creator 204. In many embodiments, the minting of an NFT involves the smart contract underlying the NFT being cryptographically signed by the content creator 204 and a content engagement platform administrator 205.

In several embodiments, content creators 204 mint NFTs using a minting service or NFT registry service that communicates with computer systems that implement an NFT blockchain 206 via the Internet 208. The NFTs are implemented as smart contracts within the NFT blockchain 206, which is the primary blockchain for storing, trading, and showcasing NFTs minted within the content engagement platform 200. A limitation of many current public blockchains such as (but not limited to) Etherium is their limitations with respect to handling high transaction volumes with low latency. Accordingly, minting NFTs to an NFT blockchain 206 can enable the content engagement platform to support large numbers of transactions without impacting other users of the public blockchain 202. For example, a content creator could issue NFTs to 100,000 s or millions of users without impacting other users of the public blockchain 202. In several embodiments a low-latency NFT blockchain 206 is implemented using a Tendermint blockchain based upon the Tendermint Core distributed by All in Bits, Inc. d/b/a Tendermint, Inc., which is a Delaware corporation. Use of a Tendermint blockchain can provide rapid transaction updates to the NFT blockchain using Byzantine Fault Tolerant consensus. While the discussion above with respect to FIG. 2 indicates that NFTs are issued to an NFT blockchain established by an administrator of the content engagement platform, content engagement platforms in accordance with a number of embodiments of the invention can also leverage a second public blockchain designed for high transaction throughput with respect to smart contracts. As can readily be appreciated, the specific type of blockchain to which NFTs are minted is largely dependent upon the requirements of a given application.

Once minted, the NFTs can be offered directly to individual users and/or made available for purchase by way of an NFT exchange 210. In many embodiments, an NFT exchange is administered by a content engagement platform administrator 205. In a number of embodiments, NFTs can be purchased via any appropriate digital exchange 210. In certain embodiments, the digital exchange 210 enables users to quickly purchase and/or sell NFTs in a distributed fashion while honoring fee distribution rules incorporated within the smart contract underlying the NFT by the content creator 204 that originally minted the NFT. In this way residual royalties can be distributed as part of the transaction protocol of the digital exchange 210. In addition, transaction entries recorded in the NFT blockchain in relation to these residual royalty payments can incorporate additional information into the NFT blockchain that can be utilized to validate the authenticity of the NFT in subsequent transactions. In many embodiments, NFTs are minted in accordance with the cNFT standard (ERC998) so that token ownership can be chained to other fungible tokens and/or NFTs. In many embodiments, entire collections of tokens can be bound to a single NFT managed by a content engagement platform. In several embodiments, NFTs can be issued to multiple users by issuing a limited (or unlimited) number of fungible tokens that represent fractional ownership (or shared possession) of a particular NFT. In several embodiments, bonding curves can be used as automated market makers via smart contract that automates buying and selling of tokens at a formula calculated price (referred to as Bonded Curve Tokens or Liquid Tokens). As can readily be appreciated, the programmatic definition of an NFT means that the manner in which an NFT can be minted and subsequently behave is largely only limited by the capabilities of the computer systems tasked with executing the instructions of the smart contracts underlying the NFTs.

In many embodiments, NFTs issued within the content engagement platform 200 can be swapped onto other blockchains such as (but not limited to) the Etherium blockchain by a content engagement platform administrator bridge system 205. In a number of embodiments, a bridge is a contract that effectively freezes a token on the NFT blockchain 206 and issues an equal token on another blockchain, while maintaining a reference between the two tokens as part of the metadata for the newly minted NFT. In a number of embodiments, the NFTs can be moved between blockchains using any of a variety of mechanisms including (but not limited to) atomic swaps that permanently move the NFT from one blockchain to another and/or any of a variety of proxy contracts that allow for issuance of a proof of ownership token on another blockchain as appropriate to the requirements of a given application. In several embodiments, NFT cross-blockchain interoperability is cryptographically verified as a way of recreating the same trust network across multiple blockchains. In a number of embodiments, computer systems within each blockchain sign and broadcast information about the relevant sister account in such a way that clients can quickly link the accounts. Once trust has been proven and linked between the blockchains, assets can be verifiably transferred between blockchains by being signed by the corresponding sibling account. In several embodiments, NFTs can be linked subject to particular restrictions such as (but not limited to) limiting transfers to atomic swaps and/or restricting all transfers of NFTs. As can readily be appreciated, the specific manner in which transfer of NFTs between particular blockchains can be permitted and/or prohibited is largely dependent upon the requirements of a given application.

Users can utilize user devices configured with appropriate applications such as (but not limited to) media wallet applications to obtain NFTs. In many embodiments, a media wallet is the smart device enabled, front-end application for fans and/or consumers, central to all user activity on a content engagement platform. It many instances, the media wallet application contains a near-complete record of a user across many different forms of media consumption, as well as providing users a central location to securely store, buy, sell and trade their digital collectibles (NFTs) and other crypto asset keys. As is discussed in detail below different embodiments of media wallet applications can provide a variety of functionality that can be determined as appropriate to the requirements of a given application.

As noted above, content creators can issue NFTs directly to specific users and/or users can purchase NFTs via distributed exchanges 210 and/or direct transactions with other users. In the illustrated embodiment, the user devices 212 are shown as mobile phones and personal computers. As can readily be appreciated user devices can be implemented using any class of consumer electronics device including (but not limited to) tablet computers, laptop computers, televisions, media extenders, and/or set top boxes as appropriate to the requirements of a given application.

As noted above, user devices 212 in accordance with many embodiments of the invention can collect observations regarding media consumption by a user. Media may be consumed directly from streaming services 214 and content downloading services 216 such as (but not limited to) the Netflix service operated by Netflix, Inc. of Los Gatos, California, the Spotify service operated by Spotify Technology S.A. of Stockholm, Sweden, and the iTunes service operated by Apple Inc. of Cupertino, California. When media is directly consumed by the user device, the user device can capture metadata regarding the streaming session and/or media playback.

In several embodiments, an application such as (but not limited to) a media wallet application or a browser plugin, executes in the background as a user consumes media and captures media consumption data passively in real-time. Once a particular media property is identified, users can opt-in or opt-out of sharing media consumption data or rely on previously established data sharing settings. Where data is shared, many embodiments also generate a user interface that enables the user can also opt-in or opt-out of receiving in real-time push notifications, survey prompts, advertisements, and/or offers related to the specific media being consumed. For example, if a user is identified to be watching a movie on a streaming platform, a pop-up notification might alert the user about an exclusive deal to buy merchandise related to that movie at discounted rates not available elsewhere. With limited interaction, users can make direct purchases of limited-time offers and deals of media products, which can be loaded directly into the media wallet application on their user device. Another example involves a user streaming an album on a platform that was just released, an application stored on the user device and communicating with the content engagement platform can identify the media content, the content creator could send a direct push notification to the user to offer them to participate in a survey providing them feedback on the content. For their participation in the survey, the content creator can reward the listener with reward tokens while simultaneously gaining valuable, real-time feedback from the consumer. In a further example, when a user viewing a video such as (but not limited to) a tutorial via the YouTube service provided by Alphabet, Inc. of Mountain View, California posted by a favorite vlogger, an application on their user device could identify the particular video being viewed and send a push notification to the user with a direct path to purchase one or more products being promoted in the video. This functionality acts as a real-time point of sale opportunity for artists and brands to collaborate beyond in-running ads and sponsorships. By paying for goods using fungible tokens, both the artist and the brands can be compensated responsibly for any sales that are generated by the campaign.

When media consumption occurs independently of but in the presence of the user device, the user device can capture observations including (but not limited to) audio, video, WiFi network, and/or GPS observations. In a number of embodiments, the user devices 212 provide information derived from the collected observations via the Internet 208 to computer systems that form a permissioned analytics blockchain 218. In a number of embodiments, the observation information is encrypted and signed by the private key of the media wallet application that captured the information and the computer systems write the encrypted observation data to the permissioned analytics blockchain 218. As discussed further below, the process of writing data to the permissioned analytics blockchain can involve securely writing data to cloud storage (potentially centralized cloud storage) and writing pointers to the securely stored data to the permissioned analytics blockchain. As can readily be appreciated, a variety of approaches can be taken to the writing of data to a permissioned analytics blockchain and the particularly approach is largely determined by the requirements of a given application. The computer systems can utilize the observations to create verified media consumption data that is also written to the permissioned analytics blockchain 218 either directly or as a pointer to a location in which the data is securely stored. Computer systems that generated validated media consumption data can be referred to as validators. In several embodiments, validators utilize media fingerprints and/or environment metadata from a content library to validate media consumption and write a media consumption record to the permissioned analytics blockchain 218. In certain embodiments, the user devices submit observations directly to validators. Where the observations are insufficient, the user may be prompted for additional information (e.g. "What song are you listening to?") via the user device to augmented the collected observations in a manner that enables verification of media consumption.

In many embodiments, media consumption data entries in the permissioned analytics blockchain 218 are encrypted using a user's public key so that the media consumption data can be accessed by the user's media wallet application. In this way, a user controls access to entries in the permissioned analytics blockchain 218 describing the user's media consumption. In several embodiments, a user can authorize content creators 204 and/or analytics service providers to access media consumption data recorded within the permissioned analytics blockchain 218 using one of a number of appropriate mechanisms including (but not limited to) compound identities where the user is the owner of the data and the user can authorize other entities as guests that can also access the data. As can readily be appreciated, a particular content creator or analytics service provider's access to the data can be revoked by revoking their status as a guest within the compound identity authorized to access the media consumption data within the permissioned analytics blockchain 218. In certain embodiments, compound entities are implemented by writing authorized access records to the permissioned analytics blockchain using the user's public key and the public keys of the other members of the compound entity. When a content creator wishes to access a particular piece of data stored within the permissioned analytics blockchain 218, the content creator can make a request to a data access service that will only grant access data stored using the permissioned analytics blockchain 218 when the content creator's public key corresponds to a public key of a guest defined within a compound identify and the access record for the compound identity authorizes the compound identity to access the particular piece of data. In this way, the user has complete control over access to their data at any time by admitting or revoking a content creator to a compound entity and/of modifying the access policies defined within the permissioned analytics blockchain 218 for the compound entity. In several embodiments, the permissioned analytics blockchain 218 supports access control lists and a user can utilize a media wallet application to modify permissions granted by way of the access control list. In many embodiments, the manner in which access permissions are defined enables different restrictions to be placed on particular pieces of information within a particular media consumption data record within the permissioned analytics blockchain 218. As can readily be appreciated, the manner in which content engagement platforms and/or immutable ledgers provide fine-grained data access permissions largely depends upon the requirements of a given application.

In several embodiments, user devices are not the only source of observations. In a number of embodiments, software applications that facilitate media consumption such as (but not limited to) media player applications can generate observation data and/or authenticated media playback data. In some instances, these software applications are signed by a content engagement platform and can themselves sign and contribute data directly to the permissioned analytics blockchain 218. In certain embodiments, media services such as (but not limited to) streaming services 214 and content download services 216 can also provide verified media consumption data to the permissioned analytics blockchain 218 directly or media wallet applications can use login credentials to access viewing history logs that can then be utilized to write media consumption data to the permissioned analytics blockchain 218. As can readily be appreciated, sources of observations and/or verified data are typically only limited by the requirements of a given application. Where the source of the media consumption data is highly reliable, the media consumption data can include granular metadata including (but not limited to) receipt ID, content ID, method of delivery, player software version, operating system, operating system version, device time, resolution, codec, average bandwidth, network connection time, geographic location, start time, duration, and/or stop time.

In a number of embodiments, the permissioned analytics blockchain 218 is based upon an incentive driven API framework whereby all request and responses are signed, encrypted and verifiably correct (or incorrect). Computer systems that participate in the permissioned analytics blockchain 218 can provide these API services as a way of contributing to the network. If the response of the API call turns out to be incorrect, the service provider of the API forfeits a non-trivial penalty with respect to a set of staked tokens. The overall scheme involves API providers taking a minimum number of tokens that can be a function of the number of requests that the system is willing to process within a given time period. The staking funding account can be used to generate a derived private/public key pair that is provably owned by the API provider and the API provider can then register as an API service provider within the permissioned analytics blockchain. Applications that interface with the permissioned analytics blockchain can then make inquiries about various records to an API service provider. The API service provider can earn tokens as a reward for providing the API, but risks losing tokens in the event that the API is implemented incorrectly.

In many embodiments, storage nodes within the permissioned analytics blockchain 218 do not provide content creators with access to a user's entire media consumption history. Instead, the storage nodes simply provide access to encrypted records. In several embodiments, the hash of the chain of records from the permissioned analytics blockchain is broadcast. Therefore, the record is verifiably immutable and each result includes the hash of the record and the previous/next hashes. As noted above, the use of compound identities and our access control lists can enable a user to grant permission to decrypt certain pieces of information or individual records within the permissioned analytics blockchain. In several embodiments, the access to the data is determined by computer systems that implement a permission-based data access service.

In several embodiments, the permissioned analytics blockchain 218 is a blockchain implemented using the Hyperledger Fabric developed by the Linux Foundation and optimized for storage of large amounts of observation information received from user devices. In other embodiments, the permissioned analytics blockchain 218 can be implemented using any blockchain technology appropriate to the requirements of a given application. As noted above, the information and processes described herein are not limited to data written to a permissioned analytics blockchain 218 and media consumption data is simply an example. Systems and methods in accordance with various embodiments of the invention can be utilized to enable applications to provide fine-grained permission to any of a variety of different types of data stored in an immutable ledger as appropriate to the requirements of a given application in accordance with various embodiments of the invention.

While various implementations of content engagement platforms are described above with reference to FIG. 2, content engagement platforms can be implemented using any number of immutable ledgers as appropriate to the requirements of specific applications in accordance with various embodiments of the invention. Various components that can be utilized within content engagement platforms are discussed further below.

III. Issuing NFTs within Content Engagement Platforms

NFT blockchains in accordance with various embodiments of the invention enable issuance of NFTs by verified users. In many embodiments, the verified users are content creators that are vetted by an administrator of a content engagement network that is responsible for deploying and maintaining the NFT blockchain. Once the NFTs are minted, users can obtain NFTs and conduct transactions with the NFTs. In several embodiments, the NFTs are redeemable for items or services in the real world such as (but not limited) admission to a movie screening and/or concert, and/or merchandise.

Figure 3:
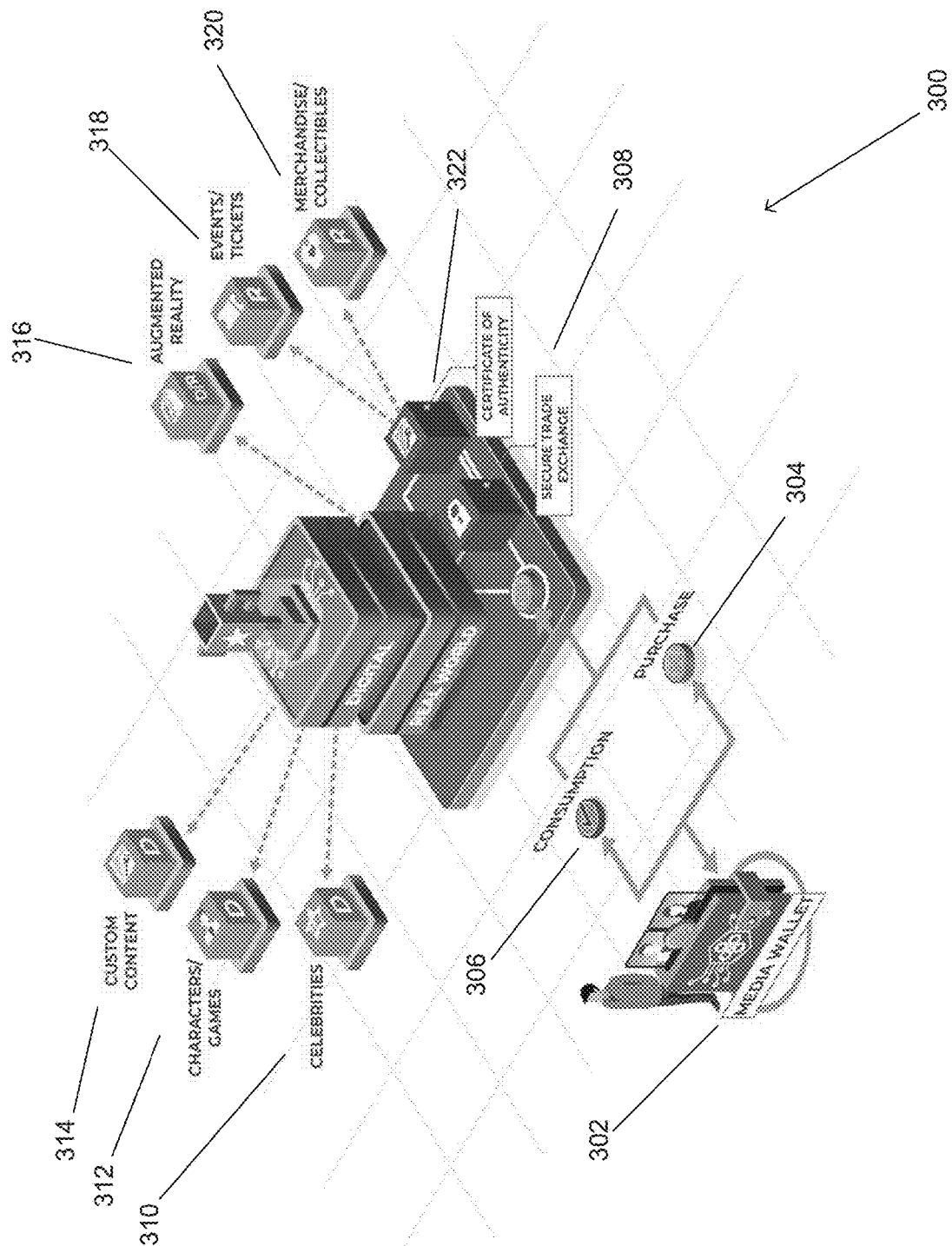
FIG. 3 is a conceptual diagram of the manner in which non-fungible tokens (NFTs) can be minted by verified content creators and stored in media wallets using a content engagement platform in accordance with an embodiment of the invention.

The manner in which users can obtain and/or conduct transactions with NFTs using media wallet applications that interact with an NFT blockchain in accordance with an embodiment of the invention is conceptually illustrated in FIG. 3. In the illustrated embodiment, a user can install a media wallet application 302 onto a user device and use the media wallet application 302 to obtain fungible tokens 304, 306. In many embodiments the fungible tokens can be fully converted into fiat currency and/or other cryptocurrency. In several embodiments, the fungible tokens are implemented using a split chain model in which the tokens can be issued to multiple blockchains (e.g. Etherium and the NFT blockchain). As can readily be appreciated, the specific tokens utilized within a content engagement platform in accordance with various embodiments of the invention are largely dependent upon the requirements of a given application.

In several embodiments, the media wallet application is capable of accessing multiple blockchains by deriving accounts from each of the various immutable ledgers used within a content engagement platform. For each of these blockchains, the media wallet application can automatically provide a simplified view whereby fungible tokens and NFTs across multiple accounts and/or multiple blockchains can be rendered as a single user profile and/or wallet. In many embodiments, the single view can be achieved using deep-indexing of the relevant blockchains and API services that can rapidly provide information to media wallet applications in response to user interactions. In certain embodiments, the accounts across the multiple blockchains can be derived using a BIP32 deterministic wallet key. In other embodiments, any of a variety of techniques can be utilized by the media wallet application to access one or more immutable ledgers as appropriate to the requirements of a given application.

NFTs can be purchased by way of exchanges 308 and/or from other users. In addition, content creators can directly issue NFTs to the media wallets 302 of specific users (e.g. by way of push download or AirDrop). In several embodiments, NFTs are issued to media wallets 302 based upon media consumption data associated with the media wallet that is accessible to the content creator.

In many embodiments, the NFTs are digital collectibles such as celebrity NFTs 310, character NFTs from games 312, NFTs that are redeemable within games 312, and/or NFTs that contain and/or enable access to custom content 314 (including augmented reality content that is location dependent 316). In many embodiments, the NFTs can enable access to specific real world experiences in the form of digital tickets 318 similar to the digital tickets described above and/or vouchers 320 that can be exchanged for or entitle the holder to a discount for physical merchandise and/or collectables. It should be appreciated that a variety of NFTs are described throughout the discussion of the various embodiments described herein and can be utilized in any content engagement platform and/or with any media wallet application.

While the NFTs are shown as static in the illustrated embodiment, content creators can utilize a user's ownership of an NFT to engage in additional interactions with the user. In this way, the relationship between a user and a particular piece of content and/or content creator can evolve over time around interactions driven by NFTs. In a number of embodiments, collection of NFTs can be gamified to enable unlocking of additional NFTs. In addition, leaderboards can be established with respect to particular content and/or franchises based upon a user's aggregation of NFTs. As is discussed further below, NFTs and/or fungible tokens can also be utilized by content creators to incentivize users to share data concerning activities including (but not limited to) media consumption behavior.

When the user wishes to purchase an NFT using fungible tokens, the user's media wallet application can request authentication of the NFT directly based upon the public key of the content creator and/or indirectly based upon transaction records within the NFT blockchain. As discussed above, minted NFTs are signed by a content creator and an administrator of the NFT blockchain. In addition, a user can verify the authenticity of a particular NFT without the assistance of entities that minted the NFT by verifying that the transaction records involving the NFT within the NFT blockchain are consistent with the various royalty payment transactions required to occur in conjunction with transfer of ownership of the NFT by the smart contract underlying the NFT.

Figures 4A, 4B, 4C:
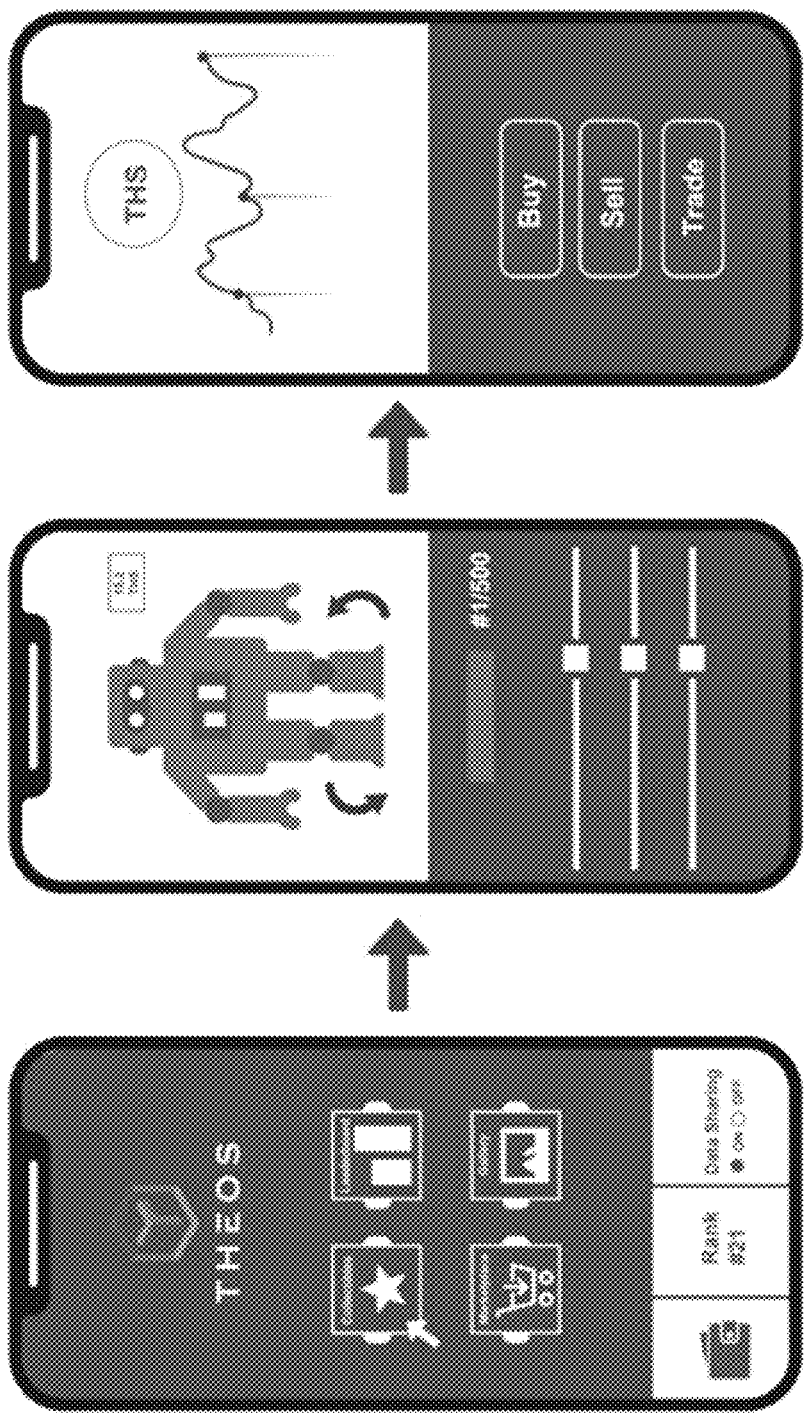

Operation of a media wallet application implemented in accordance with an embodiment of the invention is conceptually illustrated in by way of the sequence of user interfaces shown in FIGS. 4A-4C. In many embodiments, the media wallet application is an application that is installed upon a user device such as (but not limited to) a mobile phone or tablet computer running the iOS or Android operating systems. Launching the media wallet application can provide a number of user interface contexts. In many embodiments, transitions between these user interface contexts can be initiated in response to swipe gestures received via a touch user interface. As can readily be appreciated, the specific manner in which a user interfaces with a media wallet application is largely dependent upon the user input capabilities of the underlying user device.

Figure 5C:
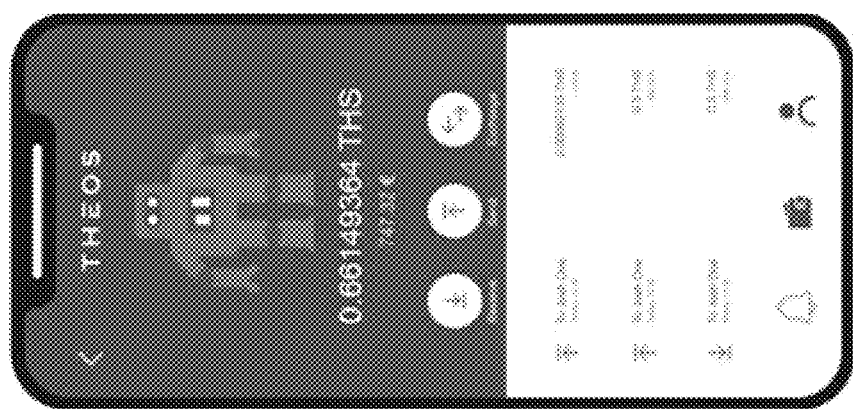
Figure 5B:
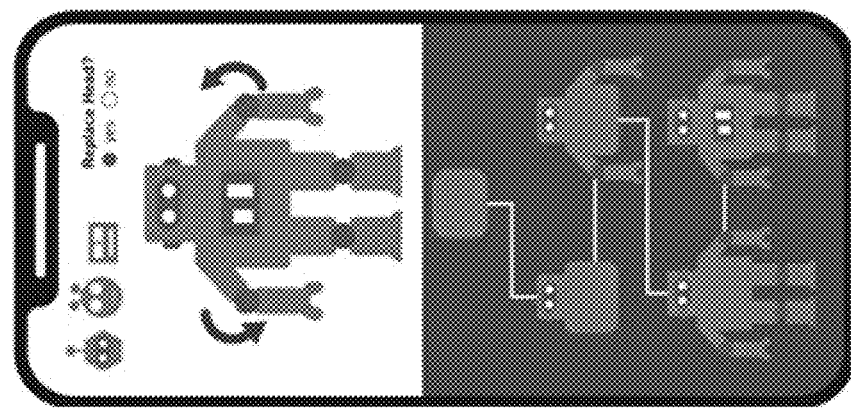

In several embodiments, a first user interface context is a dashboard (see, for example, FIG. 4A) that can include lists of tokens owned by the user, rank and/or status of the user with respect to particular fan leaderboards and/or metrics. In several embodiments, the lists can be divided into category index cards (e.g. digital merchandise/collectibles, special event access/digital tickets, fan leaderboards etc.). In certain embodiments, a second user interface context (see, for example, FIG. 4B) is provided that include a gallery view of NFTs. In a number of embodiments, each collectible can be main-staged in a quick view with its status and relevant information displayed. Each digital collectible can be presented in full screen mode in full 3-D with a high degree of interactivity (see, for example, FIG. 5B). In many embodiments, the user interface enables a user to see how characters/collectibles evolve based on how much they engage as a fan. The consumption:reward rules can define a constantly growing interactive relationship with the fan/user. A user can swipe through each collectible and interacting with the user interface can launch a collectible user interface enabling greater interaction with a particular collectible in a manner that can be determined based upon the smart contract underlying the NFT. In many embodiments, a third user interface context (see, for example, FIG. 4C) is provided that is a snapshot of a trading desk that can display more detail around a user's fan rank, market price for particular fungible tokens and NFTs. In several embodiments, additional interactions in this context can expose additional functionality enabling the user to buy and/or sell fungible tokens and NFTs via distributed exchanges (see, for example, FIG. 5C).

Figure 5A:
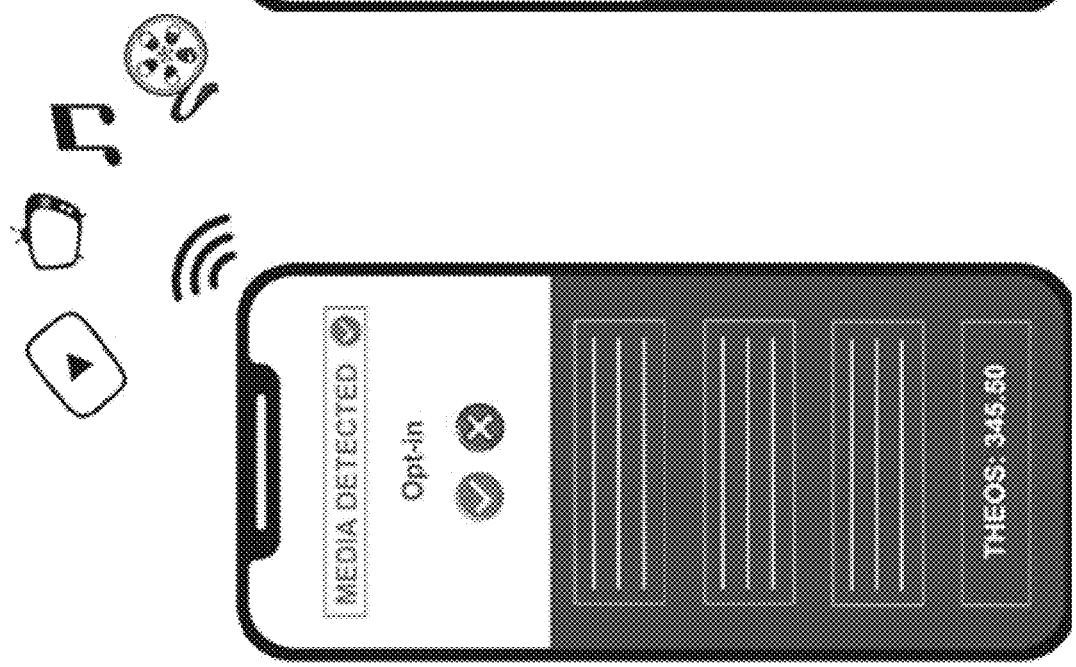

Referring again to the dashboard shown in FIG. 4A, a user interface mechanism is provided that enables the user to opt-in to data sharing. While the opt-in interface is shown as a single opt in mechanism, media wallet applications in accordance with many embodiments of the invention include a user interface that enables opt-in with respect to specific types of data and/or specific services. In many embodiments, selection to opt-in via the user interface causes the media wallet application to present the user with a number of options with respect to specific types of data to share and/or entities with which data can be shared. In a number of embodiments, the user interface can display incentives offered in exchange for the use agreeing to share data. In several embodiments, users that are willing to share data can periodically receive notices that an entity wishes to communicate with them (e.g. a survey, or an offer) and the incentive being offered in exchange for the user accepting the communication (e.g. completing a survey, or viewing an offer). In many embodiments, progressive interaction can yield greater incentives for continued interaction. When the user opts in, the media wallet application can collect observation data to detect media consumption by the user. When media consumption is detected, the media wallet can present a user interface similar to that shown in FIG. 5A providing the option to share data with respect to the consumption of that specific piece of media data. Although specific user interfaces are described above with respect to specific media wallet applications in the context of FIGS. 4A-5C, media wallet applications can be implemented in a variety of ways appropriate to specific platforms. The particular processes that can be performed by media wallet applications in accordance with various embodiments of the invention are discussed further below.

Figure 6:
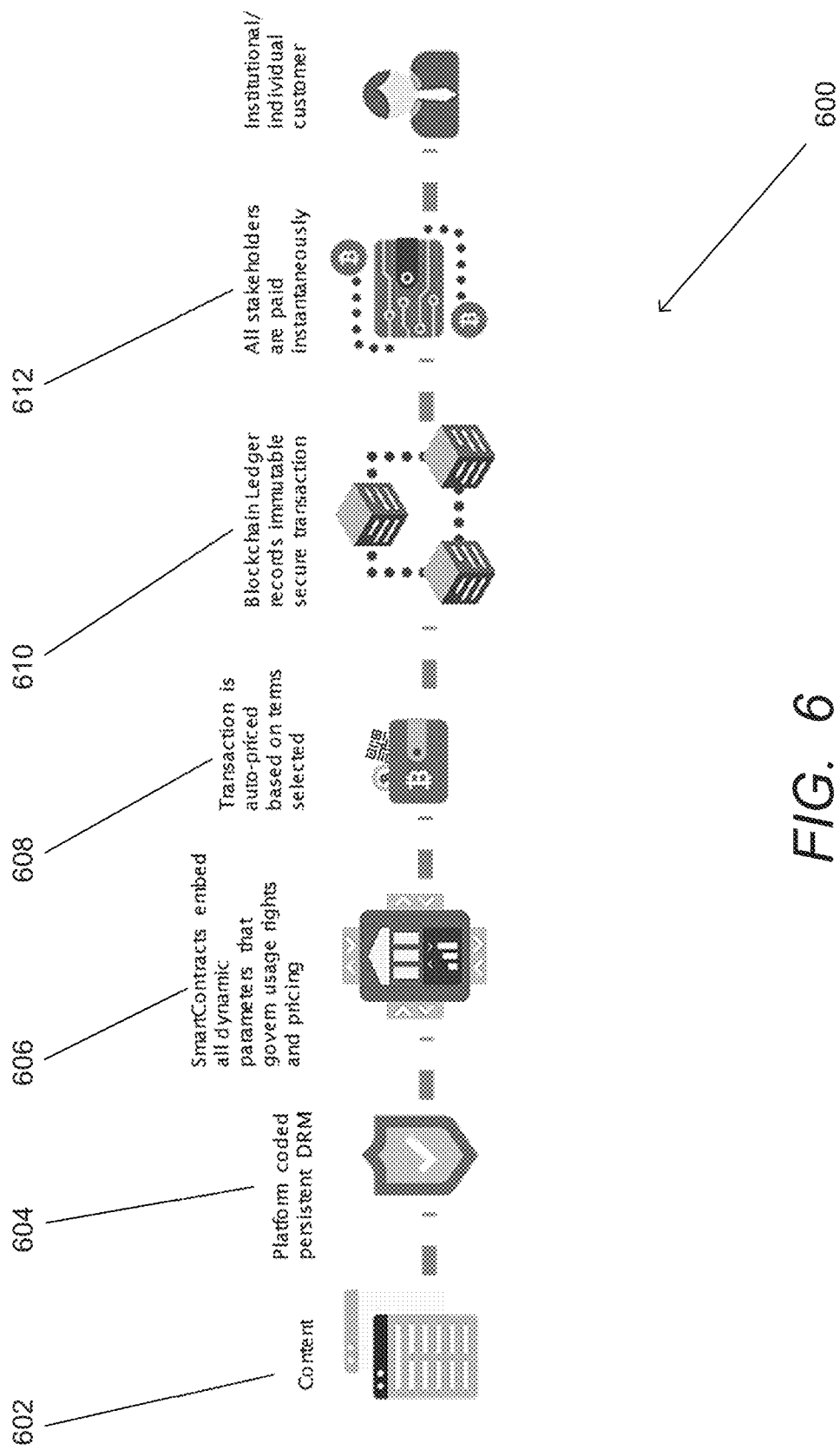
FIG. 6 conceptually illustrates a process for conducting transactions using NFTs minted in accordance with an embodiment of the invention.

The manner in which content creators that mint an NFT can receive residual royalty payments based upon a smart contract underlying an NFT can be appreciated with reference to FIG. 6. The process 600 commences when a content creator decides to issue an NFT based upon a piece of content 602. The NFT is created by defining a smart contract that includes programmatic digital right management 604 that determines the manner in which the NFT is to be used (e.g. collectible, entitles content access, digital ticket, exchangeable for a discount, etc.) and rules 606 related to residual payments in the event of particular transactions (e.g. change of ownership). When a transaction 608 occurs using the NFT, the NFT blockchain automatically processes the rules associated with the transaction. Where the transaction involves residual payments, records of the transaction involving the NFT and the transactions related to the residual payments are written 610 to the NFT blockchain and the residual payments are deposited 612 in the appropriate accounts indicated by the rules in the smart contract.

While specific processes for minting NFTs and/or specific types of NFTs that can be obtained using media wallet applications are described above with reference to FIGS. 3 and 6, the specific manner in which NFTs can be minted and/or utilized within content engagement platforms in accordance with various embodiments of the invention is largely dependent upon the requirements of a given application. Processes for utilizing NFTs to incentivize sharing of user data regarding media consumption within a content engagement platform in accordance with various embodiments of the invention is discussed further below.

IV. Permissioned Data Access within Content Engagement Platforms

In several embodiments, applications on user devices are able to cause data to be written to a blockchain in a manner that enables the provision of fine-grained access to other users. In the context of content engagement platforms, media wallet applications are able to record observations related to media consumption in a permissioned analytics blockchain and computer systems that actively maintain the permissioned analytics blockchain can verify media consumption by a user based upon the recorded observations and write records containing media consumption data to the permissioned analytics blockchain. In many embodiments, the manner in which the media consumption data is written to the permissioned analytics blockchain enables the user to control access to the data using the media wallet application. Content creators interested in obtaining access to the content consumption data either directly or by way of analytics aggregation services can incentivize users to grant access to their media consumption data using fungible tokens and/or NFTs. Consumer data consumption can be stored securely, allowing consumers to be in the driver seat of choosing to whom and how they choose to share their consumption data. If a user chooses to opt-in to sharing this data with content creators such as (but not limited to) brands, studios and labels, the user can receive in exchange fungible tokens and/or NFTs that can be used, for example, to award discounts on digital products, access to VIP features and experiences.

Figure 7:
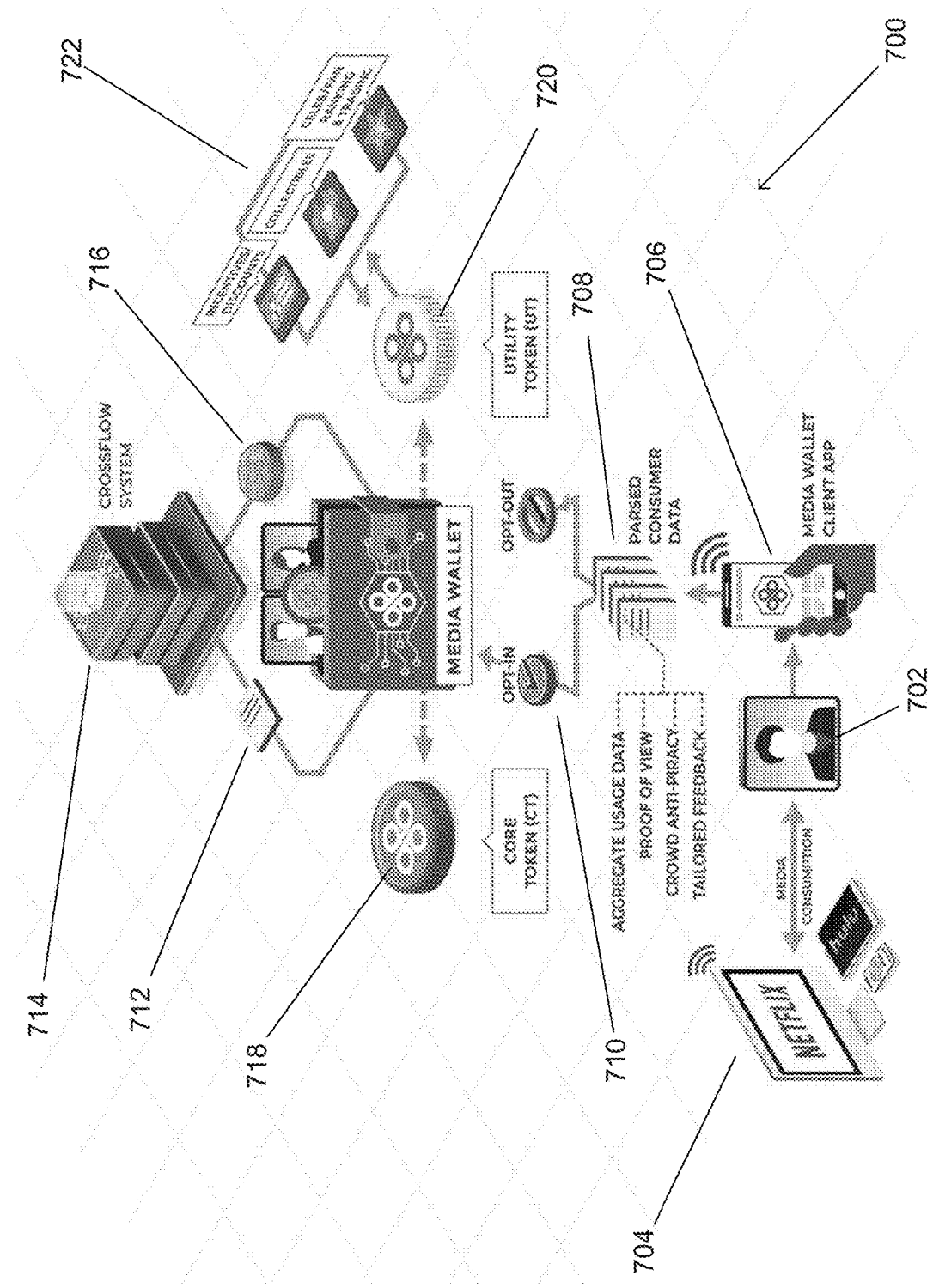
FIG. 7 conceptually illustrates capture and permission-based media consumption data using a content engagement platform in accordance with an embodiment of the invention.

A process by which a user can grant access to media consumption data in exchange for fungible tokens and/or NFTs in accordance with an embodiment of the invention is illustrated in FIG. 7. During the process 700, a user 702 consumes media (704). In the illustrated embodiment, the media consumption occurs during a streaming session with one of a number of streaming services. Media can also be consumed by downloading content for playback (including offline playback), watching broadcast content, and/or attending a movie theater or concert to consume content. The user can utilize a media wallet application 706 to aggregate observation data 708 using any of the techniques described above. The user can also decide to opt-in or opt-out (710) of sharing data concerning media consumption with specific entities (e.g. a specific content creator). In the illustrated embodiment, a particular content creator attempts to incentivize the user to share access to media consumption data 712 written to a permissioned analytics blockchain 714 by offering one or more tokens 716 in exchange for access to the data. As noted above, the content creator can offer any of a variety of tokens as incentives. In systems that create distinctions between core tokens 718 and utility tokens 720 either type of fungible token can be offered as an incentive. In addition, the content creator can directly offer one or more NFTs 722 as incentives. As can readily be appreciated, the specific incentives offered by a given entity to obtain access to data within a permissioned analytics blockchain are largely dependent upon the requirements of a given application in accordance with various embodiments of the invention.

Figure 8:
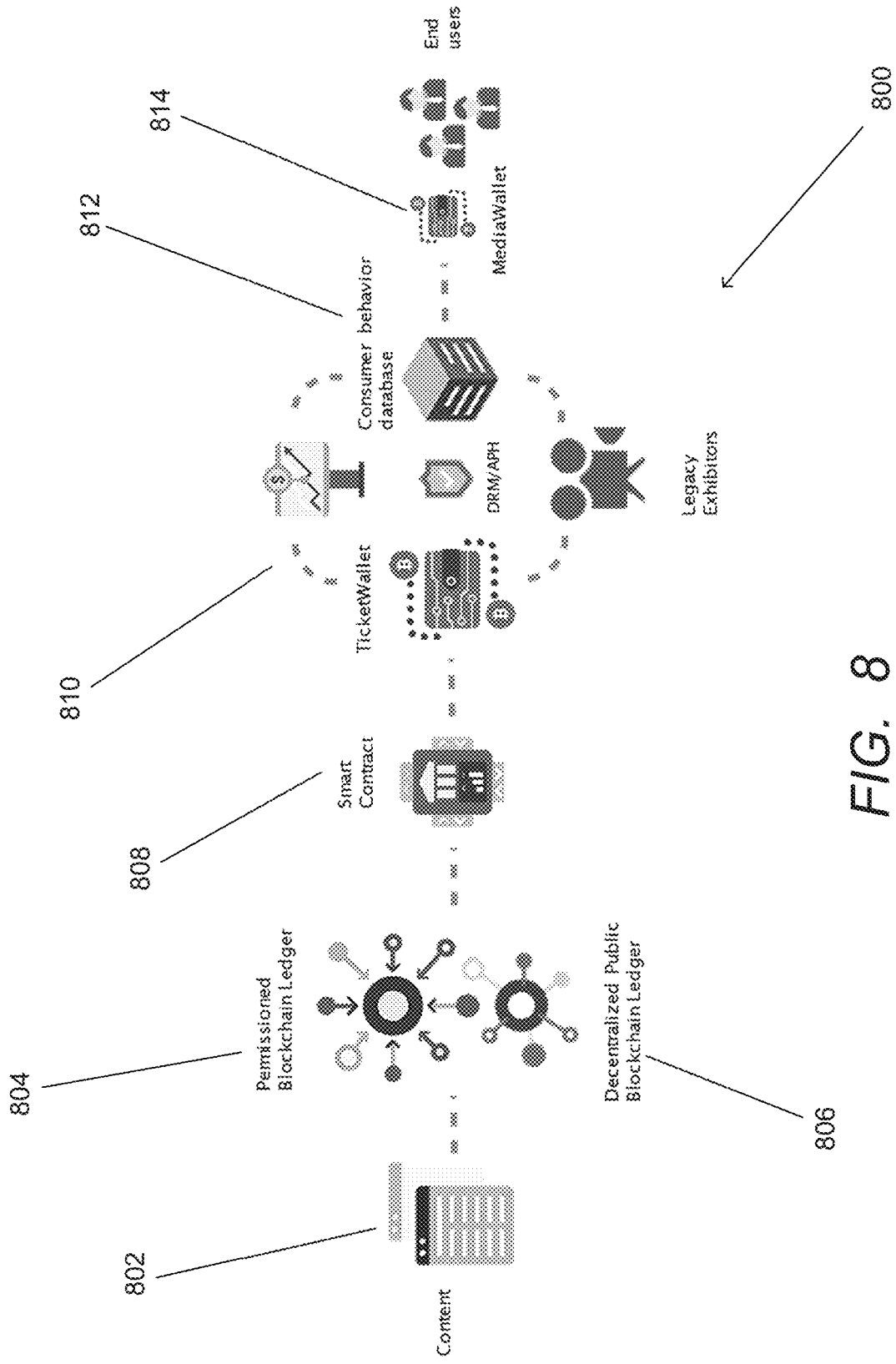
FIG. 8 conceptually illustrates a process for performing permission-based sharing of media consumption data within a content engagement platform in accordance with an embodiment of the invention.

The manner in which media wallets can be utilized to capture observations regarding media consumption behavior in accordance with an embodiment of the invention is conceptually illustrated in FIG. 8. In the illustrated embodiment, a content creator utilizes a piece of content (e.g. a brand asset, or pieces of media content) to issue an NFT to a content engagement platform that includes a permissioned blockchain 804 (e.g. a permissioned analytics blockchain) and a decentralized public blockchain 806 (e.g. an NFT blockchain and/or the Etherium blockchain) by way of a smart contract 808. In many embodiments, the NFT may result directly in media consumption (e.g. an NFT in the form of a digital ticket) that is redeemed at a legacy exhibitor. In other embodiments, the NFT enables viewing of a piece of content by a content service provider. When the NFT is associated with consumption of content 810, a distributed consumer behavior database 812 can be constructed within the permissioned blockchain ledger 804 by the media wallet application 814. As noted above, the distributed consumer behavior database 812 can be generated by writing records that contain verified media consumption data as blocks to the permissioned blockchain ledger 804. The media wallet application 814 can enable the user to restrict access to data written to the distributed consumer behavior database 812 describing the user's behavior. Accordingly, content creators can offer incentives to users in exchange for the user providing the relevant permissions to access their data within the distributed consumer behavior database.

Figure 9:
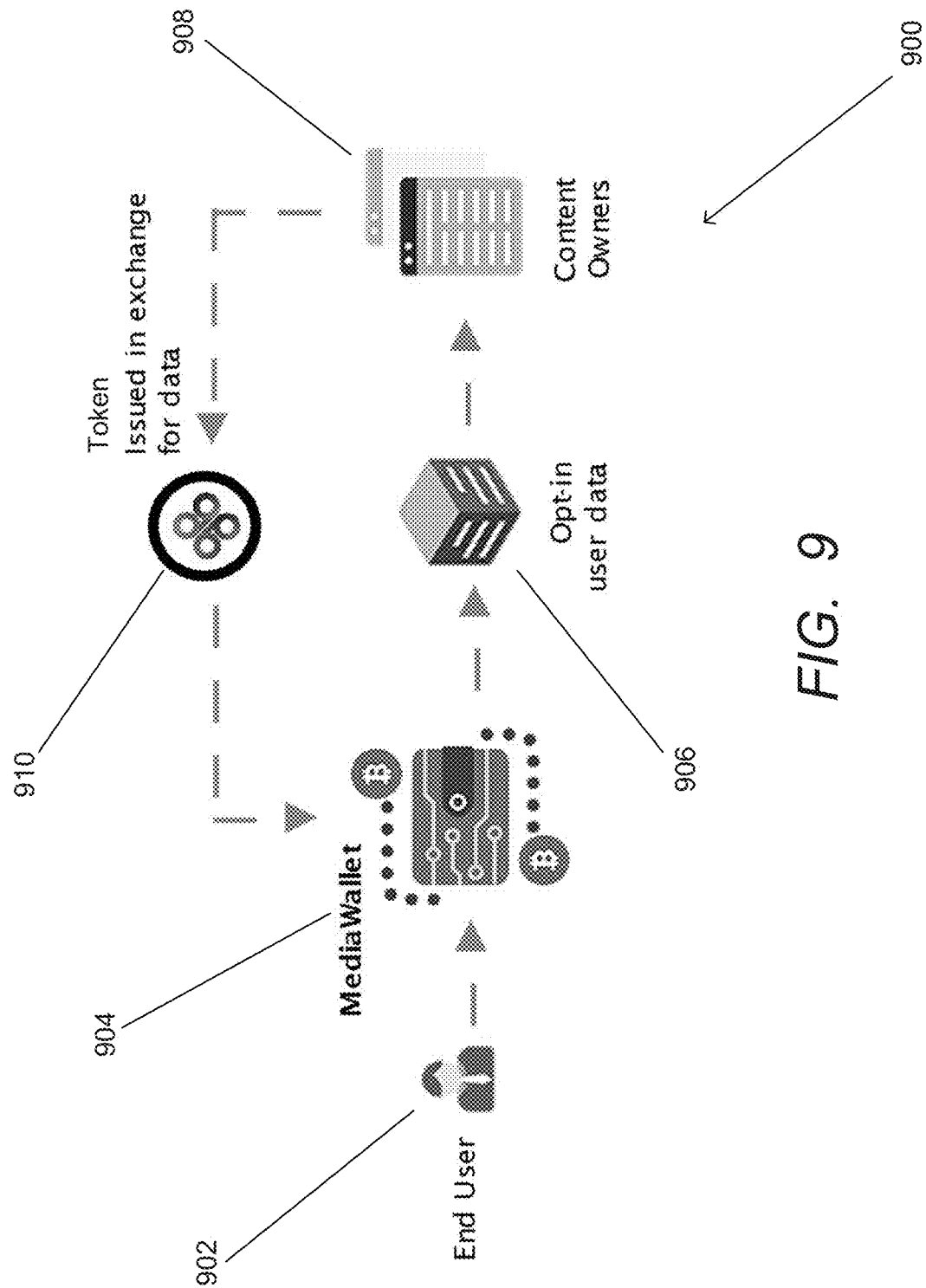
FIG. 9 conceptually illustrates a process whereby a user grants permission to access media consumption data in exchange for incentives in the form of tokens in accordance with an embodiment of the invention.

The manner in which content owners can incentivize users to share media consumption data in exchange for tokens in accordance with an embodiment of the invention is conceptually illustrated in FIG. 9. The process 900 involves a user 902 utilizing a media wallet application 904 to modify access permissions to records 906 within a permissioned analytics blockchain to enable a content owner's analytics computer system 908 to access the data to perform media consumption analytics and/or to curate offers and/or additional engagements with the user around the content consumed by the user. In the illustrated embodiment, the user modifies the permissions in exchange for a token 910.

Figure 10:
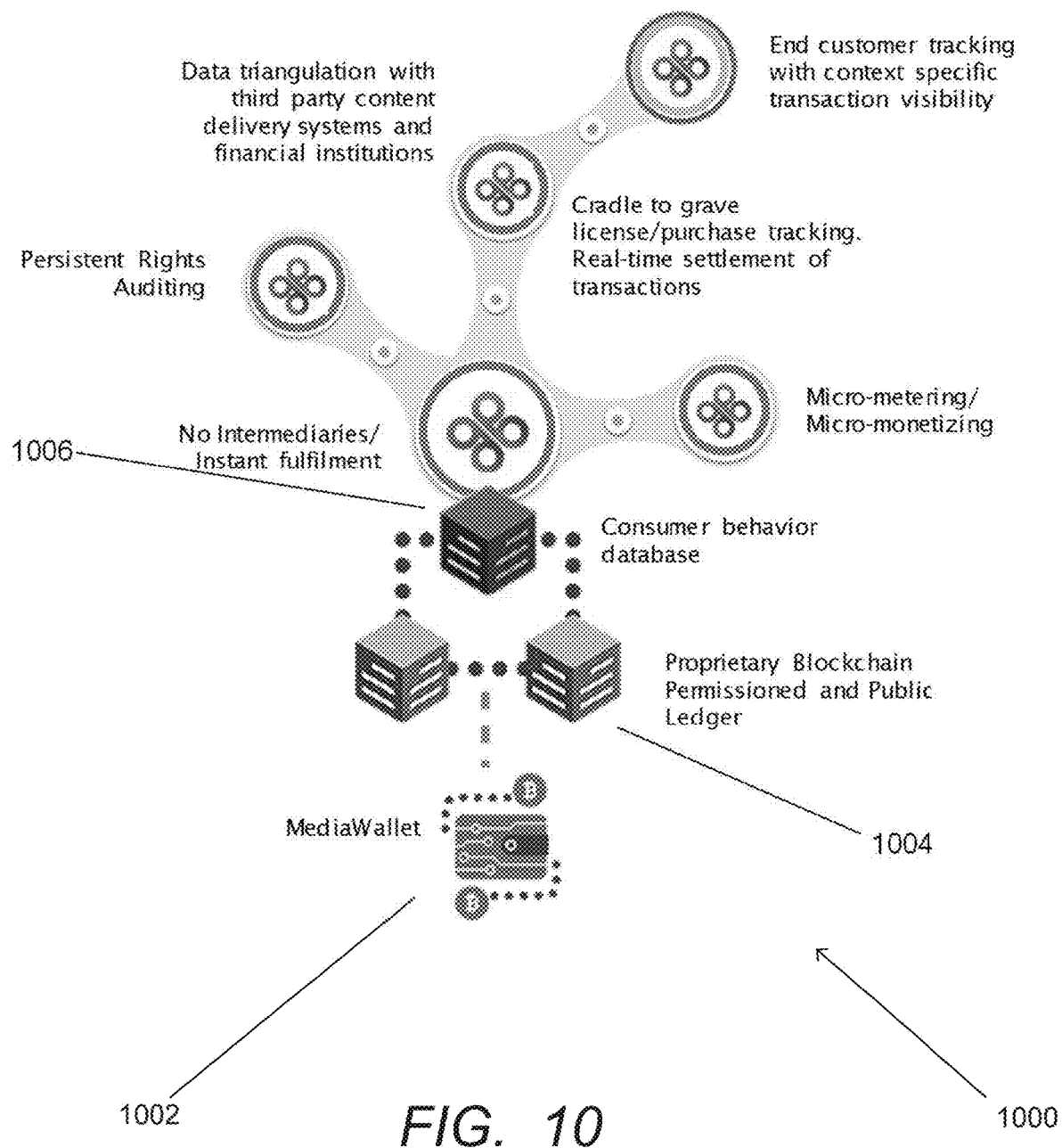
FIG. 10 conceptually illustrates the manner in which access to consumer behavior data with the permission of a user can facilitate various transactions with a content engagement platform in accordance with an embodiment of the invention.

The manner in which permissioned media consumption data can be utilized to create a distributed media consumption database in accordance with an embodiment of the invention is conceptually illustrated in FIG. 10. The process 1000 includes a media wallet application 1002 contributing media consumption observations that are utilized to commit records regarding media consumption behavior to a permissioned analytics blockchain 1004. As records are committed to the permissioned analytics blockchain 1004 a distributed database of consumer behavior 1006 is constructed in which a user can restrict access to data describing the user's own behavior within the database. When a content creator is granted permission to access the data, the content creator is able to directly interact with the consumer and gain direct insights concern the user's media consumption behavior across content distribution platforms and environments. In many embodiments, information concerning media consumption can be utilized to audit content delivery systems to confirm authorized content distribution and accurate reporting. In several embodiments, bounties and/or other incentives can be awarded to users that share data that assist content creators with the identification of parties that are distributing their content in an unauthorized manner. As can readily be appreciated, direct information concerning the users that are consuming content and the manner in which the content is consumed can be utilized by content creators in any of a variety of ways to appropriate to the requirements of a specific content creator.

While specific processes are described above with reference to FIGS. 7-10, content engagement platforms, NFT blockchains, permissioned analytics blockchains, and/or media wallets can be implemented in any of a number of different ways to enable permissioned access to media consumption data as appropriate to the requirements of specific applications in accordance with various embodiments of the invention. In addition, as noted above, systems and methods in accordance with certain embodiments of the invention are not limited to the creation of distributed databases of media consumption data but can be utilized by software applications to create distributed databases containing any of a variety of different types of data for which fine-grained access permissions can be granted with respect to data contained within the distributed database.

V. Components of Content Engagement Systems

A variety of computer systems that can be utilized within content engagement systems and systems that utilize NFT blockchains and/or that grant fine-grain permissioned access to data stored within immutable ledgers in accordance with various embodiments of the invention are illustrated in FIGS. 11-15. The computer systems are similar in that they all utilize processing systems 1102, 1202, 1302, 1402, 1502, include network interfaces 1104, 1204, 1304, 1404, 1504 and memory systems 1106, 1206, 1306, 1406, 1506. As can readily be appreciated each of these computer systems can be implemented using one or more of any of a variety of classes of computing devices including (but not limited to) mobile phone handsets, tablet computers, laptop computers, personal computers, gaming consoles, televisions, set top boxes and/or other classes of computing device. In addition, the processing systems can be implemented using one or more CPUs, GPUs, ASICs, FPGAs, and/or any of a variety of other devices and/or combinations of devices that are typically utilized to perform digital computations. Similarly, the network interfaces and memory systems are also typical of the network interfaces and memory systems that are typically found in the computing devices referenced above and are generally selected based upon the requirements of a given application.

Figure 11:
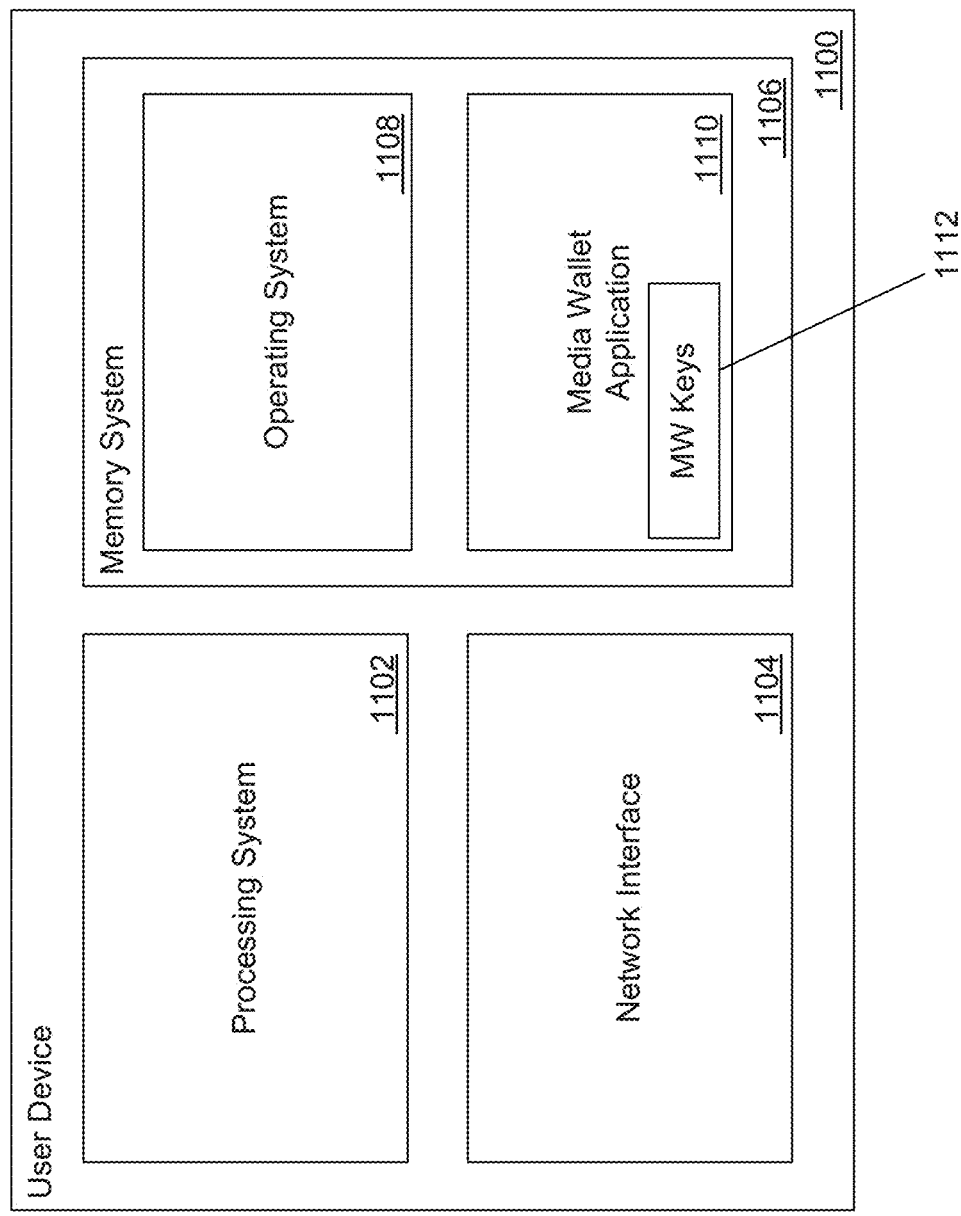
FIGS. 11-15 conceptually illustrate various devices that can be utilized with a number of platforms including content engagement platforms in accordance with various embodiments of the invention.

Referring specifically to the user device shown in FIG. 11, the memory system 1106 of the user device includes an operating system 1108 and a media wallet application 1110. The media wallet application includes a set of media wallet keys 1112 that can include a public key/private key pair that the media wallet application can use to encrypt and sign data. As noted above, the media wallet application can also include a BIP32 deterministic wallet root key. In many embodiments, the media wallet application enables the user device to obtain and conduct transactions with respect to NFTs by communicating with an NFT blockchain via the network interface 1104. In addition, the media wallet application can collect observations regarding media consumption and provide the encrypted observation data to a permissioned analytics blockchain via the network interface 1104. The media wallet application can also implement some or all of the various functions described above with reference to media wallet applications, media wallets, and user devices that are configured by media wallet applications and/or similar applications as appropriate to the requirements of a given application in accordance with various embodiments of the invention.

Figure 12:
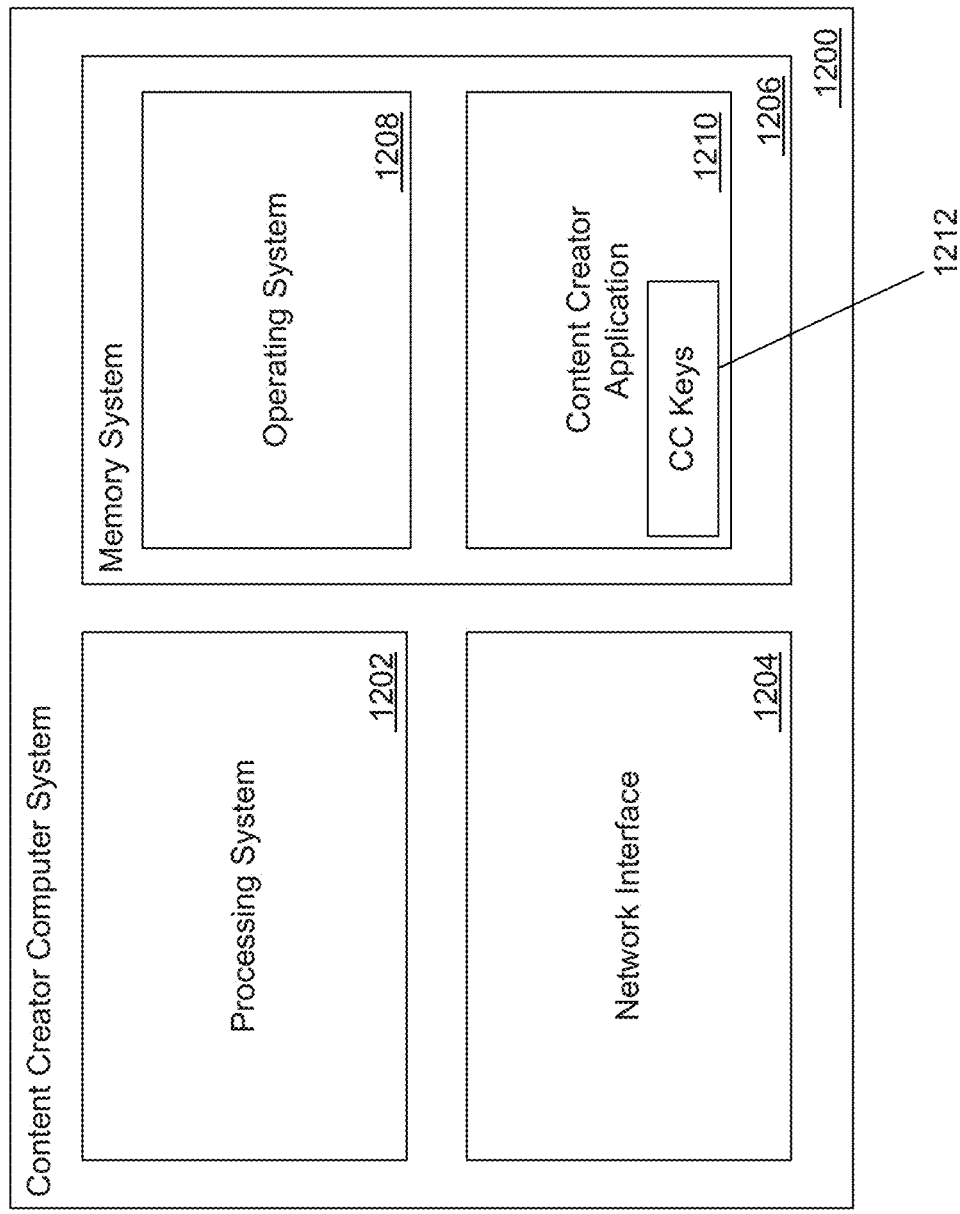

Referring specifically to the content creator computer system shown in FIG. 12, the memory system 1206 of the content creator computer system includes an operating system 1208 and a content creator application 1210 that enables the content creator computer system to mint NFTs by writing smart contracts to an NFT blockchain via the network interface 1204. The content creator application includes a set of content creator wallet keys 1212 that can include a public key/private key pair that the content creator application can use to sign NFTs minted by the content creator application. The content creator application can also implement some or all of the various functions described above with reference to content creators as appropriate to the requirements of a given application in accordance with various embodiments of the invention.

Figure 13:
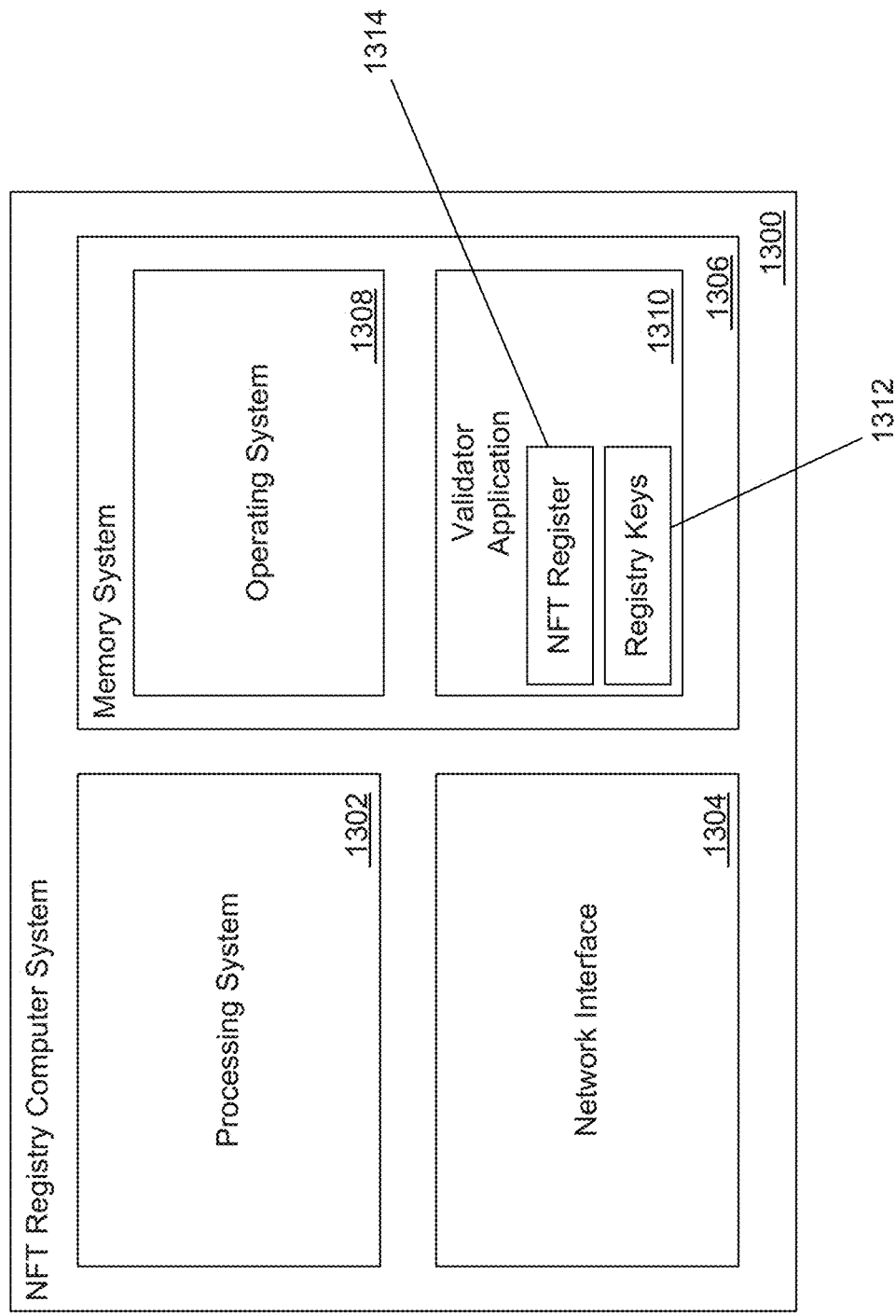

Referring specifically to the NFT register computer system shown in FIG. 13, the memory system 1306 of the content creator computer system includes an operating system 1308 and an NFT register application 1310 that configures the NFT register computer system to enable authorized users to mint NFTs to an NFT blockchain using the network interface 1204. In several embodiments, the NFT register computer system includes a set of NFT register keys 1312 that can include a public key/private key pair used to co-sign NFTs minted by an authorized user. The NFT register also includes a register 1314 of all NFTs minted to the NFT blockchain by the NFT register computing system. In several embodiments, entries in the register include a unique serial number and a pointer to a location of a smart contract corresponding to the NFT in the NFT blockchain. In other embodiments, any of a variety of sets of data can be recorded in the register maintained by an NFT register application as appropriate to the requirements of a given application. The NFT register application can also implement some or all of the various functions described above with reference to NFT exchanges and/or content engagement platform administrators as appropriate to the requirements of a given application in accordance with various embodiments of the invention.

Figure 14:
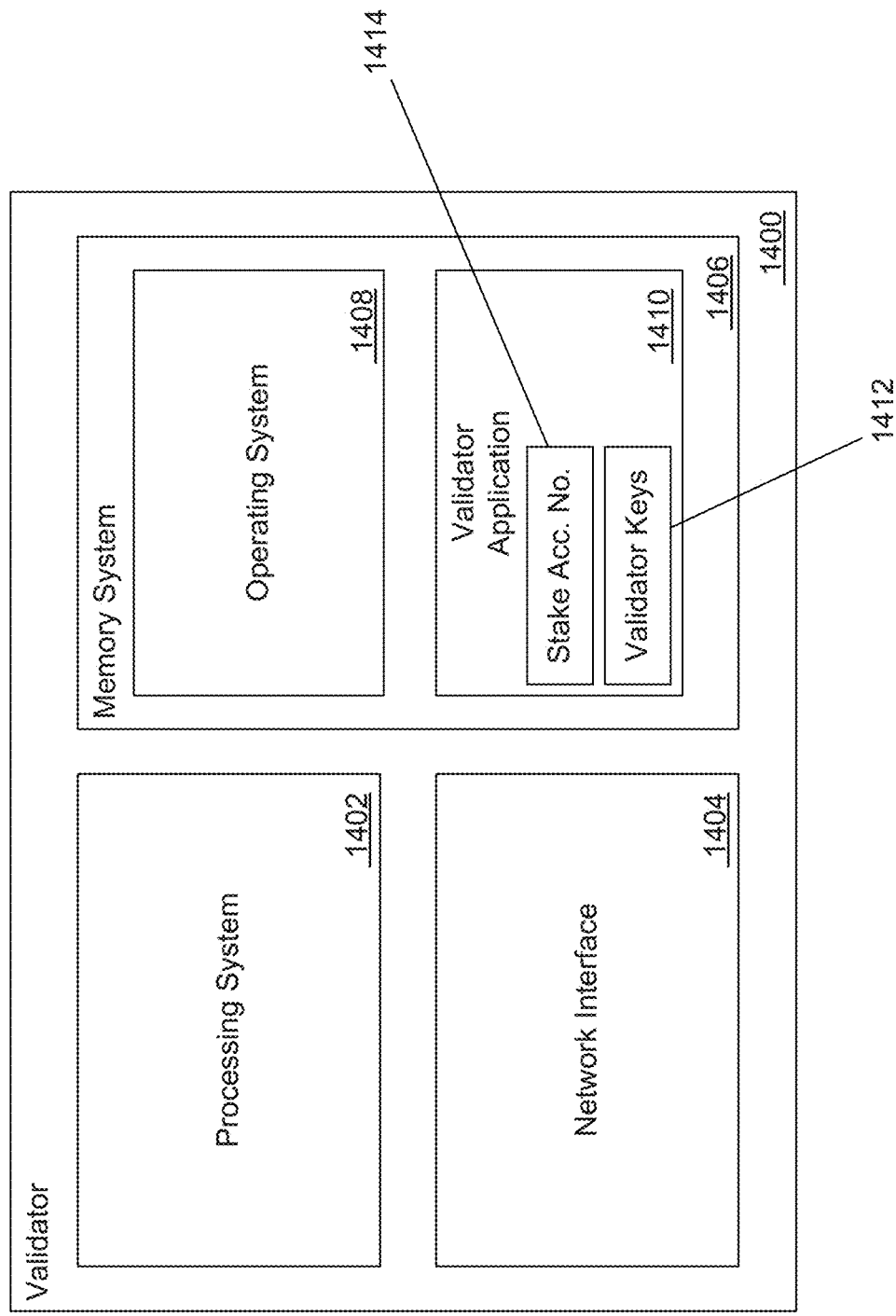

Referring specifically to the validator computer system shown in FIG. 14, the memory system 1406 of the validator computer system includes an operating system 1408 and a validator application 1410 that enables the validator computer system to implement an API service within a permissioned analytics blockchain in accordance with various embodiments of the invention. As discussed above, a validator is incentivized by the potential to earn tokens to offer the API service. However, the validator is required to stake a number of tokens in support of the accuracy of the API service that the validator provides. Accordingly, the validator application 1410 records the stake account number 1414 maintained by the validator application and a set of validator keys 1412 that are used by the validator application to sign records. In a number of embodiments of the invention, the validator accesses observations provided by user devices and uses the observations to attempt to verify media consumption by the user. When media consumption can be verified, the validator application 1410 causes a record containing the validated media consumption data to be written to a permissioned analytics blockchain. The validator application 1410 can also implement some or all of the various functions described above with reference to validators as appropriate to the requirements of a given application in accordance with various embodiments of the invention. As can readily be appreciated, similar computer systems can be utilized to implement any of the computer systems described above that provide services and/or APIs that are responsible for maintaining any of the immutable ledgers relied upon by a content engagement platform in accordance with various embodiments of the invention.

Figure 15:
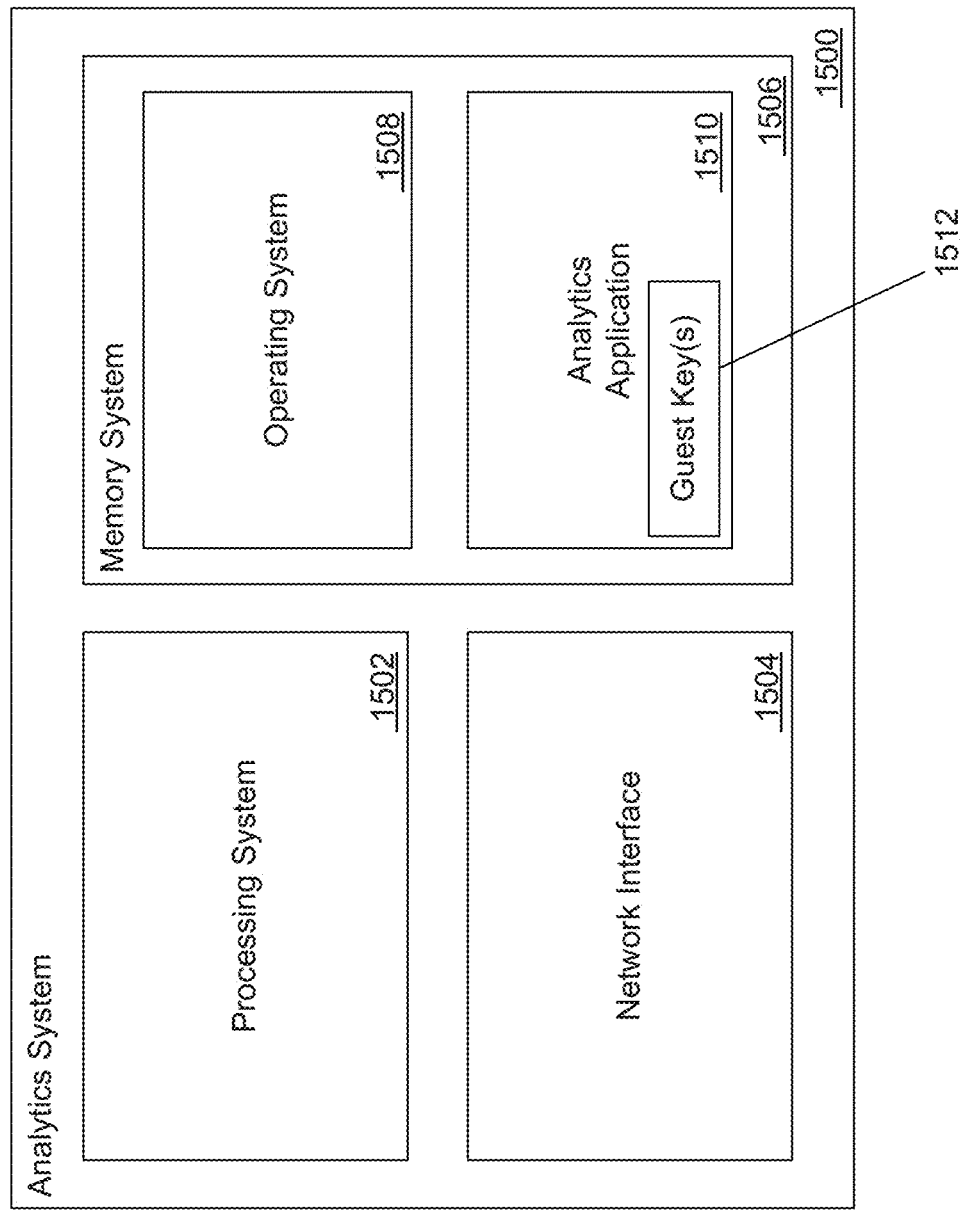

Referring specifically to the analytics system shown in FIG. 15, the memory system 1506 of the analytics system includes an operating system 1508 and an analytics application 1510 that enables the analytics system to query via the network interface 1504 computer systems that provide services that enable permissioned access to data recorded using a permissioned analytics blockchain. The analytics application includes a set of one or more guest keys 1512 that are utilized by entities that wrote data to the permissioned analytics blockchain to grant access to the data. In certain embodiments, the analytics system guest key is the public key used by the analytics application. In many embodiments, the analytics application utilizes the set of guest keys to query the permissioned analytics blockchain to derive insights concerning data including (but not limited to) media consumption data). The analytics application can also implement some or all of the various functions described above with reference to content creators and/or analytics services as appropriate to the requirements of a given application in accordance with various embodiments of the invention.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A user device, comprising:
   a processor; and
   memory containing a media wallet application;
   wherein the processor is configured by the media wallet application to:
   access at least a portion of a non-fungible token (NFT), wherein the NFT includes reference to a piece of content, and wherein the NFT is associated with a programmatically defined smart contract written to at least one immutable ledger;
   receive, via a user interface, user instructions concerning data access permissions, wherein the data access permissions relate to data associated with use of the piece of content associated with the NFT;
   determine the data access permissions in accordance with the user instructions concerning the data access permissions;
   receive an indication of the use of the piece of content associated with the NFT;
   responsive to a specific preference indicated in the data access permissions:
   generate a media consumption data record, and
   cause the media consumption data record to be stored on the at least one immutable ledger;
   receive a notification from an analytics system, wherein the notification is generated based on analysis of the media consumption data record on the immutable ledger; and
   present the notification via the user interface to a user of the user device.

2. The user device of claim 1, wherein the notification comprises at least one of an advertisement, a survey prompt, an offer associated with the piece of content, a discount, a pop-up notification, or a token.

3. The user device of claim 2, wherein the offer is associated with a product promoted in the piece of content.

4. The user device of claim 2, wherein the notification comprises a survey prompt and the processor is further configured by the media wallet application to provide a content creator provided reward to the user in response to the user providing data associated with the survey prompt.

5. The user device of claim 1, wherein the notification and/or the media consumption data record is at least in part encrypted.

6. The user device of claim 1, wherein the at least one immutable ledger is permissioned.

7. The user device of claim 1, wherein the at least one immutable ledger comprises reference to a cloud storage.

8. The user device of claim 1, wherein the processor is further configured by the media wallet application to provide an incentive to the user in response to the user selecting the specific preference.

9. The user device of claim 1, wherein the media consumption data record comprises observation data, where the observation data comprises at least one piece of data selected from the group consisting of:
   audio samples of ambient media;
   location based check-in with respect to media viewed at a movie theater;
   a photograph of a movie ticket;
   a screen capture of a media player user interface;
   a user submission of a media content rating;
   data from a log file maintained on a user device;
   information shared via a wireless network indicating presence of another user devices containing a media wallet application;
   information obtained from another application installed on the user device; and
   information obtained via a web service by the media wallet application.

10. The user device of claim 1, wherein the at least one immutable ledger comprises:
    an NFT blockchain to which the programmatically defined smart contract for the NFT is written; and
    a permissioned analytics blockchain to which the media consumption data record is written.

11. A method of controlling media consumption data, the method comprising:
    accessing, by a processor of a user device, at least a portion of a non-fungible token (NFT), wherein the NFT includes reference to a piece of content, and wherein the NFT is associated with a programmatically defined smart contract written to at least one immutable ledger;
    receiving, by the processor and via a user interface of the user device, user instructions concerning data access permissions, wherein the data access permissions relate to data associated with use of the piece of content associated with the NFT;
    determining, by the processor, the data access permissions in accordance with the user instructions concerning the data access permissions; and
    receiving, by the processor, an indication of the use of the piece of content associated with the NFT;
    responsive to a specific preference indicated in the data access permissions:
    generating, by the processor, a media consumption data record;
    causing, by the processor, the media consumption data record to be stored on the at least one immutable ledger;
    receiving, by the processor, a notification from an analytics system, wherein the notification is generated based on analysis of the media consumption data record on the immutable ledger; and
    presenting, by the processor, the notification via the user interface to a user of the user device.

12. The method of claim 11, wherein the notification comprises at least one of an advertisement, a survey prompt, an offer associated with the piece of content, a discount, a pop-up notification, or a token.

13. The method of claim 12, wherein the offer is associated with a product promoted in the piece of content.

14. The method of claim 12, wherein the notification comprises a survey prompt and the method further comprises providing, by the processor, a content creator provided reward to the user in response to the user providing data associated with the survey prompt.

15. The method of claim 11, wherein the notification and/or the media consumption data record is at least in part encrypted.

16. The method of claim 11, wherein the at least one immutable ledger is permissioned.

17. The method of claim 11, wherein the at least one immutable ledger comprises reference to a cloud storage.

18. The method of claim 11, further comprising providing, by the processor, an incentive to the user in response to the user selecting the specific preference.

19. The method of claim 11, wherein the media consumption data record comprises observation data, where the observation data comprises at least one piece of data selected from the group consisting of:
    audio samples of ambient media;
    location based check-in with respect to media viewed at a movie theater;
    a photograph of a movie ticket;
    a screen capture of a media player user interface;
    a user submission of a media content rating;
    data from a log file maintained on a user device;
    information shared via a wireless network indicating presence of another user devices containing a media wallet application;
    information obtained from another application installed on the user device; and
    information obtained via a web service by the media wallet application.

20. The method of claim 11, wherein the at least one immutable ledger comprises:
    an NFT blockchain to which the programmatically defined smart contract for the NFT is written; and
    a permissioned analytics blockchain to which the media consumption data record is written.

* * * * *